United States Patent
Jeong et al.

(10) Patent No.: US 10,243,675 B2
(45) Date of Patent: Mar. 26, 2019

(54) MOBILE DEVICE AND METHOD FOR OUTPUTTING SOUND WAVE FOR CONTROL OF EXTERNAL DEVICE, AND EXTERNAL DEVICE

(71) Applicant: POWERVOICE CO., LTD., Gyeonggi-do (KR)

(72) Inventors: Hee Suk Jeong, Gyeonggi-do (KR); Se Hun Chin, Incheon (KR); Hyung Yup Lee, Gyeonggi-do (KR)

(73) Assignee: POWERVOICE CO., LTD., Gyeonggi-do (KR)

( * ) Notice: Subject to any disclaimer, the term of this patent is extended or adjusted under 35 U.S.C. 154(b) by 0 days.

(21) Appl. No.: 14/899,722

(22) PCT Filed: Jun. 18, 2014

(86) PCT No.: PCT/KR2014/005336
§ 371 (c)(1),
(2) Date: Dec. 18, 2015

(87) PCT Pub. No.: WO2014/204191
PCT Pub. Date: Dec. 24, 2014

(65) Prior Publication Data
US 2016/0142157 A1  May 19, 2016

(30) Foreign Application Priority Data

Jun. 18, 2013 (KR) .......... 10-2013-0069594
Jun. 16, 2014 (KR) .......... 10-2014-0073053

(51) Int. Cl.
*H04B 11/00* (2006.01)
*G08C 23/02* (2006.01)

(52) U.S. Cl.
CPC ............ *H04B 11/00* (2013.01); *G08C 23/02* (2013.01); *G08C 2201/93* (2013.01)

(58) Field of Classification Search
CPC ................ G08C 23/02; H04B 11/00
(Continued)

(56) References Cited

U.S. PATENT DOCUMENTS

| 5,864,626 A * | 1/1999 | Braun ............ G09F 25/00 381/2 |
| 7,693,288 B2 * | 4/2010 | Mergler ........... G08C 19/28 381/105 |

(Continued)

FOREIGN PATENT DOCUMENTS

| CN | 2738486 Y | 11/2005 |
| CN | 101218768 A | 7/2008 |

(Continued)

OTHER PUBLICATIONS

International Search Report for PCT/KR2014/005336.

*Primary Examiner* — Vernal U Brown
(74) *Attorney, Agent, or Firm* — The PL Law Group, PLLC

(57) ABSTRACT

Provided is a mobile device including: an input reception unit for receiving at least one input through a user interface; a control information determination unit for determining control information corresponding to an operation of an external device based on the at least one input, wherein the control information includes a first symbol and a second symbol; a sound wave data generation unit for generating sound wave data corresponding to the control information; and an output unit for outputting a sound wave corresponding to the sound wave data generated by a sound wave generation apparatus. In this case, the sound wave data generation unit determines a first frequency corresponding to the first symbol and a second frequency corresponding to the second symbol, and generates the sound wave data based on the first frequency and the second frequency, and the (Continued)

sound wave data includes a portion corresponding to the first frequency and a portion corresponding to the second frequency.

20 Claims, 13 Drawing Sheets

(58) Field of Classification Search
USPC .................................. 367/32; 340/4.14, 4.42
See application file for complete search history.

(56) References Cited

U.S. PATENT DOCUMENTS

| | | | |
|---|---|---|---|
| 9,241,114 B1* | 1/2016 | McQuaide, Jr. | H04N 5/268 |
| 2002/0057213 A1* | 5/2002 | Heath | H03M 7/3088 |
| | | | 341/51 |
| 2006/0019605 A1* | 1/2006 | Shau | H04B 5/0006 |
| | | | 455/66.1 |
| 2007/0060350 A1* | 3/2007 | Osman | A63F 13/02 |
| | | | 463/35 |
| 2010/0014005 A1* | 1/2010 | Yano | G08C 17/02 |
| | | | 348/734 |

FOREIGN PATENT DOCUMENTS

| | | |
|---|---|---|
| CN | 102263576 A | 11/2011 |
| CN | 102915004 A | 2/2013 |
| JP | 2000-092344 A | 3/2000 |
| JP | 2001-036652 A | 2/2001 |
| JP | 2011-193426 A | 9/2011 |
| KR | 10-2003-0030729 A | 4/2003 |
| KR | 10-2006-0089554 A | 8/2006 |

* cited by examiner

MOBILE DEVICE AND METHOD FOR OUTPUTTING SOUND WAVE FOR CONTROL OF EXTERNAL DEVICE, AND EXTERNAL DEVICE

This application claims benefit under 35 U.S.C. 119(e), 120, 121, or 365(c), and is a National Stage entry from International Application No. PCT/KR2014/005336, filed Jun. 18, 2014, which claims priority to and the benefit of Korean Patent Application Nos. 10-2013-0069594, filed on Jun. 18, 2013, and 10-2014-0073053, filed on Jun. 16, 2014, the entire contents of which are incorporated herein by reference.

TECHNICAL FIELD

The present invention relates to a device and a method for outputting a sound wave including control information on an external device, and an external device.

BACKGROUND ART

In recent years, smart home appliances such as a refrigerator, a washing machine, an oven, a cleaner, an air conditioner, and a TV in which an Internet connection function is embedded have emerged, and the smart home appliances are becoming increasingly popular. When a new recipe or washing method is added to the smart home appliances, these smart home appliances may update the corresponding functions online and operation states of these smart home appliances may also be confirmed remotely in the open air. For example, there may be a refrigerator, and the like, having functions such as shopping and food management through the Internet, in addition to a simple refrigerating or freezing function.

Meanwhile, the smart home appliances need to be connected with an access point (AP), such as a wireless router, on a home network for Internet access and interworking with other devices. However, the current smart appliances have limited functions due to causes such as a limit of a screen and an input device, hardware specifications, and software specifications, and therefore have a problem in that an input of data for setting a network is complicated and cumbersome. As a result, a method for controlling operations of the smart home appliances without accessing the wireless router on the home network is required. Korean Patent Laid-Open Publication No. 2006-0089854 discloses a configuration of a system for controlling the operations of home appliances using a home gateway connected with an external Internet.

SUMMARY

An object of the present invention is to provide a method for controlling operations of external devices such as home appliances using a mobile device without being connected to a network through a separate wireless access device. Another object of the present invention is to provide a method for controlling control operations of external devices using a sound wave data output through a mobile device. However, the technical problem to be achieved by the embodiments of the present invention is not limited to the technical problems as described above, and therefore other technical problems may be present.

According to an embodiment of the present invention, there is provided a mobile device including: an input receiving unit configured to receive at least one input through a user interface; a control information determination unit configured to determine control information corresponding to an operation of an external device based on the at least one input, wherein the control information includes a first symbol and a second symbol; a sound wave data generation unit configured to generate a sound wave data corresponding to the control information; and an output unit configured to output a sound wave corresponding to the sound wave data generated by a sound wave generation apparatus, wherein the sound wave data generation unit determines a first frequency corresponding to the first symbol and a second frequency corresponding to the second symbol, and generates the sound wave data based on the first frequency and the second frequency, and the sound wave data includes a portion corresponding to the first frequency and a portion corresponding to the second frequency.

According to another embodiment of the present invention, there is provided a method for outputting a sound wave including: receiving at least one input through a user interface; determining control information corresponding to an operation of an external device based on the at least one input, wherein the control information includes a first symbol and a second symbol; generating a sound wave data corresponding to the control information; and outputting a sound wave corresponding to the sound wave data generated by a sound wave generation apparatus, wherein in the step of generating the sound wave data, a first frequency corresponding to the first symbol and a second frequency corresponding to the second symbol are determined, and the sound wave data is generated based on the first frequency and the second frequency, and the sound wave data includes a portion corresponding to the first frequency and a portion corresponding to the second frequency.

In addition, according to another embodiment of the present invention, there is provided a device including: a sound wave receiving unit configured to receive a sound wave output from a mobile device through a sound wave receiving apparatus; a control information acquisition unit configured to acquire control information including an ID of the device using the sound wave; and an operation execution unit configured to execute an operation corresponding to the control information based on the acquired control information, wherein the control information acquisition unit determines a first frequency corresponding to a first portion of the sound wave and a second frequency corresponding to a second portion of the sound wave, generates a first symbol corresponding to the first frequency and a second symbol corresponding to the second frequency, and acquires the control information based on a combination of the first symbol with the second symbol.

Further, according to another embodiment of the present invention, there is provided a device including: an operation execution unit configured to execute an operation of the device, a state information generation unit configured to generate state information on the device associated with the operation, wherein the state information includes a first symbol and a second symbol; a sound wave data generation unit configured to generate a sound wave data corresponding to the state information; and a sound wave output unit configured to output a sound wave corresponding to the sound wave data generated by a sound wave generation apparatus, wherein the sound wave data generation unit determines a first frequency corresponding to the first symbol and a second frequency corresponding to the second symbol, and generates the sound wave data based on the first frequency and the second frequency, and the sound wave data includes a portion corresponding to the first frequency and a portion corresponding to the second frequency.

According to another embodiment of the present invention, the device may further include: a sound wave receiving unit configured to receive a sound wave output from a mobile device through a sound wave receiving apparatus; and a control information acquisition unit configured to acquire control information using the received sound wave, wherein the operation execution unit may execute the operation based on the control information, the control information acquisition unit may determine a first frequency corresponding to a first portion of the sound wave and a second frequency corresponding to a second portion of the sound wave, generate a first symbol corresponding to the first frequency, generate a second symbol corresponding to the second frequency, and acquire the control information based on a combination of the first symbol with the second symbol.

Furthermore, according to another embodiment of the present invention, there is provided a method for outputting a sound wave including: executing an operation of the device; generating state information on the device associated with the operation, wherein the state information includes a first symbol and a second symbol; generating a sound wave data corresponding to the state information; and outputting a sound wave corresponding to the sound wave data generated by a sound wave generation apparatus, wherein in the step of generating the sound wave data, a first frequency corresponding to the first symbol and a second frequency corresponding to the second symbol are determined, and the sound wave data is generated based on the first frequency and the second frequency, and the sound wave data includes a portion corresponding to the first frequency and a portion corresponding to the second frequency.

According to any one of the above-described configurations of the present invention, it is possible to determine the control information corresponding to the operation of the external device based on the input of a user. It is possible to generate the sound wave data corresponding to the control information determined using the mobile device. It is possible to control the operation of the external device using the sound wave data output through the mobile device. It is possible to control the operations of the external devices such as home appliances using the mobile device without being connected to the network through the wireless access device.

DETAILED DESCRIPTION

Figure 1:
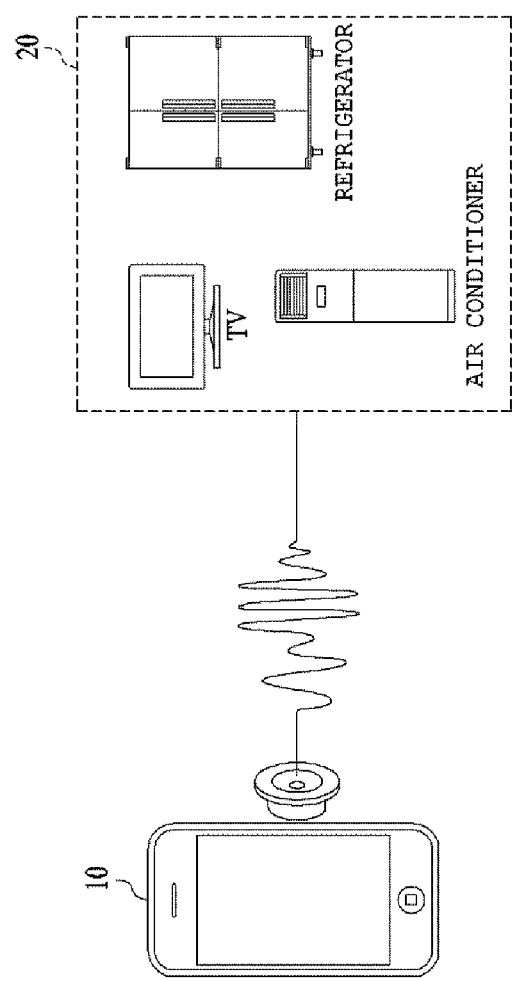
FIG. 1 is a view illustrating a configuration of a device control system according to an embodiment of the present invention.

Hereinafter, embodiments of the present invention will be described in detail with reference to the accompanying drawings so as to be easily practiced by those skilled in the art to which the present invention pertains. However, the present invention may be modified in various different ways and is not limited to the embodiments provided in the present disclosure. In the accompanying drawings, portions particularly unrelated to the present disclosure will not be described in order to obviously describe the present invention, and similar reference numerals will be denoted to describe similar portions throughout the present specification.

In addition, throughout the present specification, when any one part is referred to as being "connected to" another part, it means that any one part and another part are "directly connected to" each other or are "electrically connected to" each other through other part installed therebetween. In addition, unless explicitly described to the contrary, "comprising" any components will be understood to imply the inclusion of other elements rather than the exclusion of any other elements.

The following embodiments are described in detail for helping understanding of the present invention and do not limit the scope of the present invention. Therefore, the invention of the same scope performing the same function as the present invention also belongs to the scope of the present invention.

FIG. 1 is a view illustrating a configuration of a device control system according to an embodiment of the present invention. Referring to FIG. 1, the device control system includes a mobile device 10 and an external device 20.

The mobile device 10 may receive at least one input through a user interface and determine control information corresponding to an operation of the external device 20 based on the received at least one input. For example, when receiving an input dragged to a specific position, the mobile device 10 may determine the control information for operating a robot cleaner in the external device 20, and when receiving an input waving the mobile device like a fan, the mobile device 10 may also determine the control information for operating an air conditioner.

The mobile device 10 may generate a sound wave data corresponding to the control information and output a sound wave corresponding to the sound wave data generated by a sound wave generation apparatus. For example, the mobile device 10 may encode preset control information for operating the robot cleaner and an ID of the robot cleaner with the sound wave data, and output the encoded sound wave through a speaker.

The mobile device 10 may determine additional information related to the control information on the external device 20, and may be connected to the external device 20 through a network to transmit the determined additional information. For example, the mobile device 10 may transmit additional information such as detailed temperature in connection with the control information controlling an operation of a refrigerator through the network connected to the external device 20.

The mobile device 10 may receive the sound wave output from the external device 20, generate the control information corresponding to the received sound wave, and output the sound wave corresponding to the generated control information. In this case, the sound wave output from the external device 20 may include state information on the external device 20, in which the state information is at least one of the present state and fault diagnosis information. An example of the present state may include a turn on/off of the external device 20, a power supply use state, an operation time, and the like, and an example of the fault diagnosis may include abnormal symptom occurrence information, an error code, fault portion information, and the like.

The network means a connection structure which may exchange information between the respective nodes such as terminals and servers. An example of the network may include a 3rd generation partnership project (3GPP) network, a long term evolution (LTE) network, a world interoperability for microwave access (WIMAX) network, Internet, a local area network (LAN), a wireless local area network (Wireless LAN), a wide area network (WAN), a personal area network (PAN), a Bluetooth network, a satellite broadcasting network, an analog broadcasting network, a digital multimedia broadcasting (DMB) network, and the like but is not limited thereto.

Meanwhile, the mobile device 10 may be implemented by a portable terminal which may access a remote server through the network. Herein, the portable terminal is a mobile communication apparatus having portability and mobility. An example of the portable terminal may include all types of handheld based wireless communication apparatuses such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a long term evolution (LTE) terminal, a smartphone, a SmartPad, and a tablet PC. However, a type of the mobile device 10 illustrated in FIG. 1 is only exemplified for convenience of explanation, and therefore a type and a shape of transmitting terminal 20 and receiving terminal 30 is not to be restrictively construed as one illustrated in FIG. 1.

Figure 2:
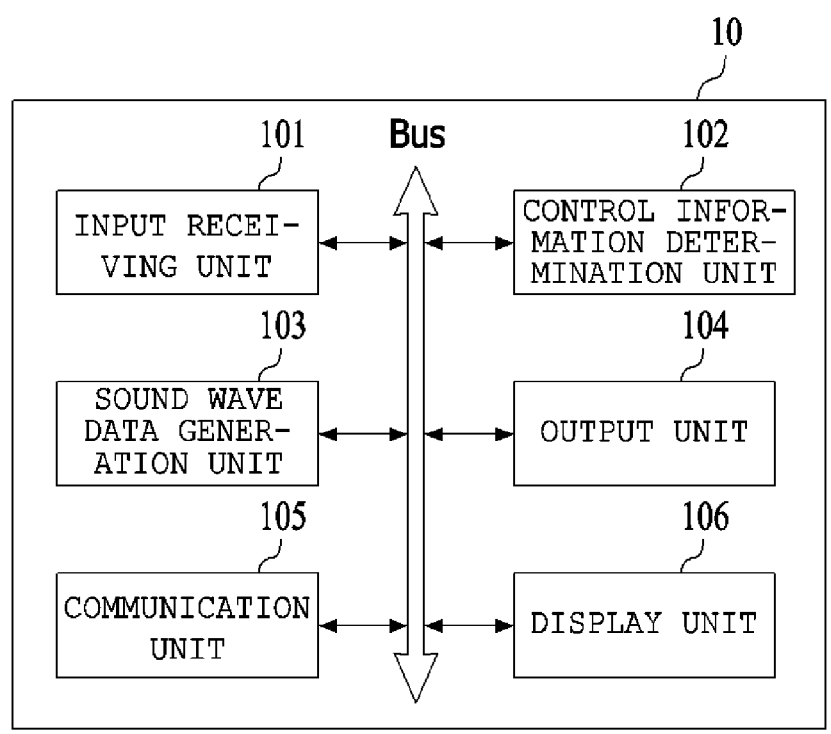
FIG. 2 is a view illustrating a configuration of a mobile device according to the embodiment of the present invention.

An operation of the mobile device 10 will be again in detail with reference to FIG. 2.

The external device 20 may receive the sound wave output from the mobile device 10 through a sound wave receiving apparatus, and acquire the control information using the received sound wave. For example, the external device 20 may receive a sound code, which is encoded and output through a speaker of the mobile device 10, from the mobile device 10, and acquire control information and an ID of the external device 20 by decoding the received sound code.

The external device 20 may confirm an object of the control information based on the ID of the external device 20, and perform the operation corresponding to the control information.

The external device 20 may be implemented as smart home appliances which may have a network function and may be equipped with a service control function to provide various smart services. Generally, the smart home appliances may be automatically adjusted to demonstrate optimal performance and may mean home appliances such as a refrigerator, a washing machine, an air conditioner, an oven, and a microwave in which a communication function is embedded. However, a form of the external device 20 illustrated in FIG. 1 is only exemplified for convenience of explanation. Therefore, a type and a form of the external device mentioned in the present disclosure are not limited to one illustrated in FIG. 1.

During performing the operation of the external device 20, the external device 20 may generate state information on the external device 20 in association with the operation thereof, generate a sound wave data corresponding to the generated state information, and output a sound wave corresponding to the generated sound wave data. Further, the external device 20 may receive the sound wave output from the mobile device 10 as a response corresponding to the output sound wave.

The operation of the external device 20 will be described in more detail with reference to the following drawings.

FIG. 2 is a view illustrating a configuration of the mobile device according to the embodiment of the present invention. Referring to FIG. 2, the mobile device 10 includes an input receiving unit 101, a control information determination unit 102, a sound wave data generation unit 103, an output unit 104, a communication unit 105, and a display unit 106.

The input receiving unit 101 receives at least one input through the user interface. The user interface includes at least one of an interface recognizing a motion of the mobile device 10, an interface recognizing a motion and a movement of a user through a camera, a touch panel interface, a hardware button input interface, and a voice recognition interface, but it is not limited thereto.

For example, the input receiving unit 101 may receive an input dragging a screen or drawing a circle through a touch panel, and may also receive an input waving the mobile device 10 like a fan. Meanwhile, the input receiving unit 101 may also receive different inputs from each other through a first user interface and a second user interface. For example, the input receiving unit may receive a user's voice through a voice recognition function while receiving a touch input through the touch panel.

The control information determination unit 102 determines the control information corresponding to the operation of the external device 20 based on the at least one input which is input through the input receiving unit 101. For example, when receiving the input dragging a screen or drawing a circle through the touch panel, the control information determination unit 102 may determine the control information controlling a robot cleaner among the external devices 20 so as to be operated, and when receiving the input waving the mobile device 10 like the fan, the control information determination unit may determine the control information controlling the air conditioner so as to be operated. One example of the determined control information may include a turn on/off of a power supply for the external device 20, a temperature control of the refrigerator among the external devices 20, an operating time control of the air conditioner, a moving path control of the robot cleaner, an operating time control of the microwave, and the like, but it is not limited thereto, and therefore various types of control information may be determined.

The control information determination unit 102 may receive the sound wave output form the external device 20, and generate the control information corresponding to the received sound wave. In this case, the output sound wave may include the state information on the external device 20, and the control information determination unit 102 may generate the control information based on the state information. For example, the control information determination unit 102 may recognize a problem of the external device 20 based on the state information on the external device 20, and generate the control information for solving the problem of itself or by interworking with a separate fault diagnosis server.

The sound wave data generation unit 103 generates the sound wave data corresponding to the determined control information. For example, the sound wave data generation unit 103 may generate the determined control information as the sound wave data which is the sound code by a multi tone based encoder. The multi tone based encoder has an advantage capable of increasing an information content of characters, and may currently represent up to 64 characters and numerals. Further, the multi tone based encoder may use a frequency having an interval of 200 Hz which may a withstand surrounding interference and represent information, and may have a header, a body, and an error correction protocol structure.

In another example, the sound wave data generation unit 103 may generate the control information as the sound wave data by an encoder using a non-audible band. The encoder using the non-audible band may secure a stable recognition rate even in a noise environment by a pure tone synthesis of the non-audible band. As described below, generating one sound signal or one sound code corresponding to one frequency may be represented as pure tone based encoding and generating one sound signal or one sound code corresponding to at least two frequencies may be represented as multi tone based encoding.

In a method for generating a sound wave data by the sound wave data generation unit 103, the sound wave data generation unit 103 may map the determined control information to each frequency, synthesize the mapped control information with the pure tone of the non-audible band to generate a predetermined code, and apply a protocol having an error correction code to the generated predetermined code to generate the non-audible sound wave data. Meanwhile, the sound wave data generation unit 103 may map the control information to each frequency, and also apply the mapped control information to the protocol having the error correction code to generate the sound wave data. Further, the sound wave data generation unit 103 may also generate a voice signal "control information from a smart phone is being transmitted to an air conditioner" or the sound wave data synthesized with music using the generated non-audible sound wave data. The sound wave data may also be used while being mixed with a sound code, a sound QR code, and the like.

The sound wave data generation unit 103 may also generate the sound wave data corresponding to the control information and the ID of the external device 20. In this case, the external device 20 may be a device selected as a destination of the sound wave among a plurality of external devices 20. For example, the sound wave data generation unit 103 may generate a sound wave data corresponding to an ID of any one of the external devices 20 to generate a sound wave data for a device which wants to transmit the control information. In other words, the sound wave data generation unit 103 may select the sound wave data including the ID of the refrigerator among the plurality of external devices 20. By doing so, the sound wave data generation unit may select only the refrigerator as the external device 20 to be controlled to generate the sound wave data for transmitting the control information.

The sound wave data generation unit 103 may generate a plurality of partial information corresponding to the control information, determine a plurality of frequencies corresponding to the plurality of generated partial information, and combine sound signals corresponding to each of the plurality of determined frequencies according to a predetermined time interval to generate the sound wave data corresponding to the control information.

The control information may include the plurality of partial information. In this case, the partial information may be a symbol included in the control information. One example of the partial information or the symbol may include at least one of characters such as '⸱' and 'a,' numerals such as '1' and '2,' and signs (or codes). Further, the characters may be used as an upper concept including numerals and signs (or codes). Further, alphanumeric and alphanumeric characters may be used as the upper concept including at least one of characters, numerals, and signs.

The sound wave data generation unit 103 may determine frequencies corresponding to each of the plurality of partial information. For example, the sound wave data generation unit 103 separates a total bandwidth of 5000 Hz between 16000 Hz and 21000 Hz, which are the non-audible sound wave band frequency, in a unit of 200 Hz, thus to be divided into 25 frequencies, and then determines each of the divided 25 frequencies as frequencies corresponding to 25 partial information, respectively. The sound wave data generation unit 103 may determine, for example, a frequency of a first symbol 'A' among control information 'AB2@' as 16000 Hz, determine a frequency of a second symbol 'B' as 16200 Hz, determine a frequency of a third symbol '2' as 16400 Hz, and a frequency of a fourth symbol '@' as 17000 Hz.

The sound wave data generation unit 103 may determine a first frequency corresponding to the first symbol and determine a second frequency corresponding to the second symbol. In this case, the first symbol and the second symbol may be included in the control information. As such, one meaning data (for example, control information) may be mapped to each of the plurality of symbols by the sound wave data generation unit 103, and each of the plurality of symbols may be mapped to each of the plurality of frequencies. In this case, the symbol may be selected from a specific symbol set (or specific code set). For example, the symbol may be a symbol selected from the plurality of symbols included in an American standard cord for information interchange (ASCII code) set, for example. In this case, the ASCII code set may include a small letter in English such as 'a' to 'z,' numerals such as '0' to '9,' special characters such as '!' and '?,' and a capital letter in English such as 'A' to 'Z,' signs (or codes) such as '+' and '=.' The following Table 1 shows one example of a plurality of symbols included in the ASCII code.

TABLE 1

| a | u | = | I |
| b | v | ! | J |
| c | w | # | K |
| d | x | % | L |
| e | y | & | M |
| f | z | + | N |
| g | . | ? | O |
| h | / | _ | P |
| i | ; | , | Q |
| j | : | @ | R |
| k | 0 | ~ | S |
| l | 1 | ^ | T |
| m | 2 | A | U |
| n | 3 | B | V |

TABLE 1-continued

| o | 4 | C | W |
|---|---|---|---|
| p | 5 | D | X |
| q | 6 | E | Y |
| r | 7 | F | Z |
| s | 8 | G | * |
| t | 9 | H | $ |

As another example, the symbol may be a symbol selected from a plurality of symbols included in a Hex code set. In this case, each symbol may be any one of 16 symbols such as '0' to '9' and 'A' to 'F' included in a first Hex code set. In addition, each symbol may be any one of 256 symbols such as '00,' '01,' . . . , '0A,' '0B,' . . . '20,' '21,' . . . , '2A,' '2B,' . . . , 'FE,' and 'FF' included in a second Hex code set. Each symbol within the second Hex code set may include 16 symbols included in the first Hex code set as a symbol element. That is, similar to each symbol of the second Hex code set, the specific symbol may consist of at least two symbol elements. In this case, the symbol element may also be any one of characters, numerals, and signs (or codes).

The following Table 2 represents one example of the symbols included in the first Hex code set. In this case, the first Hex code set may further include 5 codes such as 'L' and 'G' for a header, a tail, a continuity code (or redundancy code) in addition to 16 symbols such as '0' to '9' and 'A' to 'F.'

TABLE 2

| 0 | HEX 16 |
|---|---|
| 1 | |
| 2 | |
| 3 | |
| 4 | |
| 5 | |
| 6 | |
| 7 | |
| 8 | |
| 9 | |
| A | |
| B | |
| C | |
| D | |
| E | |
| F | |
| L | Header/ |
| G | Tail/ |
| + | Continuity code |
| / | |
| * | |

The following Table 3 represents one example of the symbols included in the second Hex code set. In this case, the second Hex code set may further include 5 codes such as 'L' and 'G' for a header, a tail, a continuity code (or redundancy code) in addition to 256 symbols such as '00,' '01,' . . . , '0A,' '0B,' . . . , '20,' '21,' . . . , '2A,' '2B,' . . . , 'FE,' and 'FF.'

TABLE 3

| 00 | 10 | 20 | HEX256 |
|---|---|---|---|
| 01 | 11 | 21 | |
| 02 | 12 | 22 | |
| 03 | 13 | 23 | |
| 04 | 14 | 24 | |
| 05 | 15 | 25 | |
| 06 | 16 | 26 | |
| 07 | 17 | 27 | |
| 08 | 18 | 28 | |
| 09 | 19 | 29 | |

TABLE 3-continued

| 0A | 1A | 2A | |
|---|---|---|---|
| 0B | 1B | 2B | |
| 0C | 1C | . . . | |
| 0D | 1D | | |
| 0E | 1E | | |
| 0F | 1F | FF | |
| L | | | Header/ |
| G | | | Tail/ |
| + | | | Continuity code |
| / | | | |
| * | | | |

As another example, the symbol may be a symbol selected from a plurality of symbols included in a binary code set. In this case, the binary code set may be any one of first to N-th binary code sets depending on a bit number. Further, each binary code set may have different numbers of symbols included therein depending on the bit number. The following Table 4 represents one example the first to N-th binary code set. As shown in the following Table 4, the first binary code set having 1 bit may include two symbols of '0' and '1,' the second binary code set having 2 bits may include four symbols of '00' to '11,' and the N-th binary code set having N bits may include $2^N$ symbols such as '00, . . . 00' to '11 . . . 11.' According to the embodiment of the present invention, the sound wave data generation unit 103 may select any one of the plurality of code sets and include information on the code set in the control information.

TABLE 4

| | bit Number | | | | |
|---|---|---|---|---|---|
| | 1 bit | 2 bit | 3 bit | 4 bit | . . . | N bit |
| | 0 | 00 | 000 | 0000 | | 00 . . . 00 |
| | 1 | 01 | 001 | 0001 | | 00 . . . 01 |
| | | 10 | 010 | 0010 | | 00 . . . 10 |
| | | 11 | 011 | 0011 | | 00 . . . 11 |
| | | | 100 | 0100 | | . . . |
| | | | 101 | 0101 | | 11 . . . 11 |
| | | | 110 | 0110 | | |
| | | | 111 | 0111 | | |
| | | | | 1000 | | |
| | | | | 1001 | | |
| | | | | 1010 | | |
| | | | | 1011 | | |
| | | | | 1100 | | |
| | | | | 1101 | | |
| | | | | 1110 | | |
| | | | | 1111 | | |
| Symbol Number | 2 | 4 | 8 | 16 | . . . |

The sound wave data generation unit 103 may select frequencies corresponding to each of the plurality of symbols included in the control information from the plurality of frequencies. In this case, the plurality of frequencies may be frequencies included in a predefined frequency set. Further, the plurality of frequencies may be frequencies arranged to have a predetermined frequency interval from a lowest frequency to a highest frequency among the plurality of frequencies. For example, when the plurality of frequencies are selected within a range in which they are equal to or larger than 16000 Hz and are equal to or smaller than 24000 Hz, they may include '16000 Hz,' '16200 Hz,' '16400 Hz,' . . . , '23600 Hz,' '23800 Hz,' and '24000 Hz' arranged so as to have a frequency interval of 200 Hz from a lowest frequency of 16000 Hz to a highest frequency of 24000 Hz.

An example of determining a frequency interval will be described. The sound wave data generation unit 103 may determine the frequency interval (or frequency step) by a scheme such as the following Equation 1 using a sample rate and an FFT point value. In this case, the sample rate may mean a sampled frequency per 1 second at the time of recording a sound. For example, if the sample rate is set to be 1000 Hz, it may mean the sampling is performed at a period of 1000 times per 1 second. Generally, as the sample rate is increased, the sound quality is improved, but the capacity of the stored file is increased. The sample rate may be a rate determined as a default or one received from a user or a manager, and may also be a sample rate for a sound code itself or voice/music data output along with the sound code. Further, a fast Fourier transform (FFT) point may mean the number of frequencies input during performing the FFT, but it is not limited thereto. The FFT point may be a point determined as a default or may be a point received from the user or the manager, but may be the FFT point for the sound code itself or the voice/music data output along with the sound code. Meanwhile, the following Table 5 shows one example of a frequency step determined depending on the sample rate and the FFT point.

$$\text{frequency step} = \frac{\text{sample rate}}{\text{FFT point}} \quad \text{[Equation 1]}$$

TABLE 5

| | | sample rate(Hz) | | | |
|---|---|---|---|---|---|
| | | 1600 | 32000 | 44100 | 48000 |
| FFT point | 128 | 125 Hz | 250 Hz | 344.5313 Hz | 375 Hz |
| | 512 | 31.25 Hz | 62.5 Hz | 86.13281 Hz | 93.75 Hz |
| | 1024 | 15.625 Hz | 31.25 Hz | 43.06641 Hz | 46.875 Hz |
| | 2048 | 7.8125 Hz | 15.625 Hz | 21.5332 Hz | 23.4375 Hz |

Referring to the above Table 5, when the sample rate is '48000 HZ' and the FFT point is '1024,' the frequency step may be '46.875 Hz.' In this case, when the lowest frequency is '16000 Hz,' the plurality of frequencies may include '16000 Hz,' '16046.88 Hz,' . . . , '19750 Hz,' . . . , '39953.13 Hz' (frequency when i is 511) as shown in the following Table 6 according to the following Equation 2. However, in this case, when the plurality of frequencies need to be selected within a range in which they are equal to or larger than 16000 Hz which is the non-audible frequency band and they are equal to or smaller than 24000 Hz, the highest frequency among the plurality of frequencies may be '23968.75 Hz' which is a frequency when i is 170.

$$f = i \cdot fs + f_{Lowest}, \quad 0 \le i < \frac{FFT \text{ point}}{2} \quad \text{[Equation 2]}$$

($fs$: frequency step)

TABLE 6

| i | f(Hz) |
|---|---|
| 0 | 16000 |
| 1 | 16046.88 |
| 2 | 16093.75 |
| 3 | 16140.63 |
| 4 | 16187.5 |

TABLE 6-continued

| i | f(Hz) |
|---|---|
| 5 | 16234.38 |
| 6 | 16281.25 |
| 7 | 16328.13 |
| 8 | 16375 |
| 9 | 16421.88 |
| 10 | 16468.75 |
| 11 | 16515.63 |
| 12 | 16562.5 |
| 13 | 16609.38 |
| 14 | 16656.25 |
| 15 | 16703.13 |
| 16 | 16750 |
| 17 | 16796.88 |
| 18 | 16843.75 |
| 19 | 16890.63 |
| 20 | 16937.5 |
| 21 | 16984.38 |
| 22 | 17031.25 |
| 23 | 17078.13 |
| 24 | 17125 |
| 25 | 17171.88 |
| 26 | 17218.75 |
| 27 | 17265.63 |
| 28 | 17312.5 |
| 29 | 17359.38 |
| 30 | 17406.25 |
| 31 | 17453.13 |
| 32 | 17500 |
| 33 | 17546.88 |
| 34 | 17593.75 |
| 35 | 17640.63 |
| 36 | 17687.5 |
| . . . | . . . |
| 80 | 19750 |
| . . . | . . . |

The sound wave data generation unit 103 may determine frequencies corresponding to each of the plurality of symbols. For example, the plurality of symbols are ones selected from the plurality of symbols included in the ASCII code set, for example, and when the plurality of frequencies are determined as listed in the above Table 6, the sound wave data generation unit 103 may determine the frequencies corresponding to each of the plurality of symbols as shown in the following Table 7.

TABLE 7

| symbol | f(Hz) |
|---|---|
| a | 16000 |
| b | 16046.88 |
| c | 16093.78 |
| d | 16140.63 |
| e | 16187.5 |
| f | 16234.38 |
| g | 16281.25 |
| h | 16328.13 |
| i | 16375 |
| j | 16421.88 |
| k | 16468.75 |
| l | 16515.63 |
| m | 16562.5 |
| n | 16609.38 |
| o | 16656.25 |
| p | 16703.13 |
| q | 16750 |
| r | 16796.88 |
| s | 16843.75 |
| t | 16890.63 |
| u | 16937.5 |
| v | 16984.38 |
| w | 17031.25 |
| x | 17078.13 |
| y | 17125 |

TABLE 7-continued

| symbol | f(Hz) |
|---|---|
| z | 17171.88 |
| . | 17218.75 |
| / | 17265.63 |
| ; | 17312.5 |
| : | 17359.38 |
| 0 | 17406.25 |
| 1 | 17453.13 |
| 2 | 17500 |
| 3 | 17546.88 |
| 4 | 17593.75 |
| 5 | 17640.63 |
| 6 | 17687.5 |
| 7 | 17734.38 |
| ... | ... |
| $ | 19750 |

The above-described plurality of frequencies may be frequencies included in the non-audible sound wave frequency band (or non-audible frequency band). That is, according to the embodiment of the present invention, the plurality of frequencies may be frequencies included in the non-audible sound wave frequency band. One example of the non-audible sound wave frequency may be a frequency band within a range between 16000 Hz and 24000 Hz. However, the present invention is not limited thereto. For example, another example of the non-audible sound wave frequency band may be a frequency band in a range between 17000 Hz and 24000 Hz.

According to another embodiment of the present invention, the plurality of frequencies may be a frequency included in the audible sound wave frequency band (or audible frequency band). An example of the audible sound wave frequency band may be a frequency band in a range between 1700 Hz and 12000 Hz. However, the present invention is not limited thereto. For example, another example of the audible sound wave frequency may be a frequency band in a range between 100 Hz and 8000 Hz.

When the plurality of frequencies are the frequency included in the audible sound wave frequency band, the plurality of frequencies mapped to each of the plurality of symbols may be as shown in the following Table 8. In this case, when the sample rate is 48000 Hz and the FFT point is 1024, the frequency step is determined as 46.875 Hz according to the above Equation 1, and the lowest frequency may be determined as 1734.38 Hz included in the range between 1700 Hz and 12000 Hz which is the audible sound wave frequency band. Further, the plurality of symbols may be determined based on all or some of the ASCII codes.

TABLE 8

| symbol | f(Hz) |
|---|---|
| a | 1734.38 |
| b | 1781.25 |
| c | 1828.13 |
| d | 1875 |
| e | 1921.88 |
| f | 1968.75 |
| g | 2015.63 |
| h | 2062.5 |
| i | 2109.38 |
| j | 2156.25 |
| k | 2203.13 |
| l | 2250 |
| m | 2296.88 |
| n | 2343.75 |
| o | 2390.63 |

TABLE 8-continued

| symbol | f(Hz) |
|---|---|
| p | 2437.5 |
| q | 2484.38 |
| r | 2531.25 |
| s | 2578.13 |
| t | 2625 |
| u | 2671.88 |
| v | 2718.75 |
| w | 2765.63 |
| x | 2812.5 |
| y | 2859.38 |
| z | 2906.25 |
| . | 2953.13 |
| / | 3000 |
| ; | 3046.88 |
| : | 3093.75 |
| 0 | 3140.63 |
| 1 | 3187.5 |
| 2 | 3234.38 |
| 3 | 3281.25 |
| 4 | 3328.13 |
| 5 | 3375 |
| 6 | 3421.88 |
| 7 | 3468.75 |
| ... | ... |
| $ | 5437.5 |

The sound wave data generation unit 103 may generate a plurality of sound signals corresponding to each of the plurality of frequencies. For example, the sound wave data generation unit 103 may generate the first sound signal corresponding to the first frequency and the second sound signal corresponding to the second frequency. The sound wave data generation unit 103 may also generate, as a sound signal, a sine sound wave signal, which has a central (or fundamental) frequency or a carrier frequency as a frequency. For example, the sound wave data generation unit 103 may generate the sine sound wave signal having a frequency of 16000 Hz as the fundamental frequency.

The sound wave data generation unit 103 combines or arranges the plurality of sound signals depending on a predetermined time interval, thus to generate the sound wave data corresponding to the control information. In this case, each of the sound signals arranged depending on the time interval may consist of each frame of the sound codes.

The sound code may include a header, a body, and a tail. In this case, the body may include the plurality of sound signals, and the header may include an additional sound signal (or additional sound code) corresponding to additional information such as identification information of an encoder and identification information of a decoder, and the tail may include an error correction sound signal (or error correction sound code) corresponding to an error correction code such as a cyclic redundancy check (CRC).

According to the embodiment of the present invention, the sound wave data generation unit 103 may divide the audible sound wave frequency band corresponding to the voice and the non-audible sound wave frequency band corresponding to the sound code, and may generate and output voice data and sound wave data for each of the divided frequency bands. The audible sound wave frequency band may be a frequency band in the range between 1700 Hz and 12000 Hz, and the non-audible sound wave frequency band may be a frequency band in the range between 16000 Hz and 24000 Hz.

The output unit 104 may output the sound wave corresponding to the sound wave data generated by the sound wave generation apparatus. The output unit 104 may output the sound wave corresponding to the sound wave data generated by the sound wave data generation unit 103 and the sound wave corresponding to the music data synthesized with the pre-stored music. The output unit 104 may also output the sound wave data corresponding to the sound wave data of the non-audible area. For example, the output unit 104 may output the sound wave through a speaker which is the sound wave generation apparatus of the mobile device 10. The sound wave output through the speaker may be a sound wave of the non-audible area which is inaudible to the user, and may be a sound wave in which information on a radio access apparatus has a form mapped to a predetermined frequency band. Meanwhile, the sound wave may also be a form corresponding to the music data pre-stored in the mobile device 10.

The sound wave output through the output unit 104 may be input to the sound wave receiving apparatus of the external device 20, and the external device 20 may acquire the control information using the sound wave. Further, the external device 20 may perform the operation corresponding to the control information based on the acquired control information. For example, the external device 20 may receive the sound wave output through the output unit through a mike which is the sound wave receiving apparatus, decode the input sound wave to acquire the ID of the external device 20 and the control information, confirm the device to be controlled based on the acquired ID of the external device 20, and perform the operation corresponding to the control information.

Although not illustrated in the drawings, the mobile device 10 may further include an input unit (not illustrated) for receiving the sound wave generated from the external device 20 through the sound wave receiving apparatus. In this case, the sound wave may correspond to state information such as a current operation state and fault diagnosis information of the external device 20. As described above, the control information determination unit 102 may generate the control information based on the sound wave input through the input unit (not illustrated). As such, according to the embodiment of the present invention, if the external device 20 first outputs the sound wave informing its own state, the mobile device 10 may output the sound wave corresponding to the control information as a response thereto.

The control information determination unit 102 may decode or interpret the sound wave generated from the external device 20 to generate the state information. Contents which are not described with reference to the operation of the control information determination unit 102 are the same as or similar to the contents for describing an operation of a control information acquisition unit 202 of FIG. 4 below, and therefore, the contents for describing the operation of the control information acquisition unit 202 of FIG. 4 below will be applied thereto as it is. However, upon the application, the 'control information' in the description for the control information acquisition unit 202 is considered as the 'state information.'

According to another embodiment of the present invention, the mobile device 10 may first output the control information, and the external device 20 may also output the sound wave corresponding to its own state information as a response thereto.

According to another embodiment of the present invention, the mobile device 10 may further include the communication unit 105 for transmitting and receiving a wireless signal corresponding to a wireless communication standard to and from the external device 20. In this case, the wireless communication standard may be any one of Wi-Fi, near field communication (NFC), Bluetooth, Zigbee, and radio frequency identification (RFID), but it is not limited thereto.

The communication unit 105 enable, for example, an NFC tag and approach the enabled NFC tag to the external device 20, and as a result may transmit the determined control information to the external device 20. In this case, the external device 20 may perform the operation corresponding to the control information based on the control information transmitted through the NFC tag.

As another example, the communication unit 105 may also be paired with the external device 20 through the Bluetooth to transmit the control information to the external device 20. The external device 20 may perform the operation corresponding to the control information based on the control information transmitted through the Bluetooth.

Meanwhile, when the communication unit 105 receives the wireless signal including the response to the sound wave output through the output unit 104, the control information determination unit 102 may also generate the control information corresponding to the response. For example, the control information determination unit 102 may determine the control information for controlling the operation of the corresponding device based on the current operation state information of the external device 20 which is received from the external device 20 through the communication unit 105.

The control information determination unit 102 may additionally determine additional information associated with the control information, and may also transmit the wireless signal corresponding to the additional information determined by the communication unit 105 to the external device 20. The additional information may be information controlling in more detail the operation of the external device 20 for setting the operation temperature of the refrigerator, setting the operation time of the air conditioner, or the like.

The control information determination unit 102 may determine the control information based on a first input which is input through a first user interface and the additional information based on a second input which is input through a second user interface. In other words, the control information determination unit 102 may receive different inputs to determine the first input as the control information and the second input as the additional information. For example, the control information determination unit may determine the control information based on an input dragged through the touch panel and determine the additional information based on a voice input from the user.

The control information determined by the control information determination unit 102 may be generated as the sound wave data to be output in the form of the sound wave through the sound wave generation apparatus and transmitted to the external device 20, and the determined additional information may be transmitted to the external device 20 through the wireless signal.

The display unit 106 may display at least one of the ID of the external device 20, an ID of the mobile device 10, the current state of the external device 20, and the fault information of the external device 20 on a display of the mobile device 10. The information displayed by the display unit 106 may be information output as the sound wave from the external device 20 to be received by the input unit (not illustrated), and may be information transmitted as the wireless signal to be received by the communication unit 105.

Figure 3:
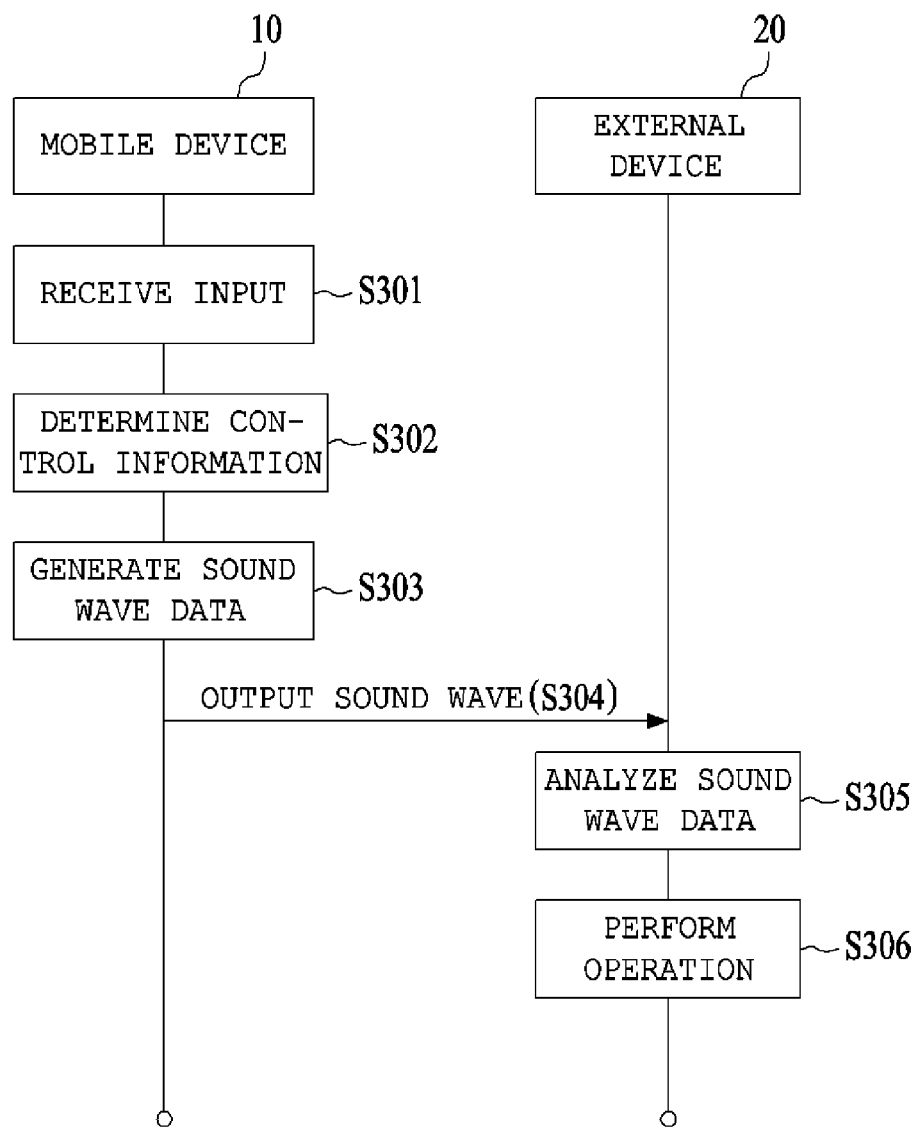
FIG. 3 is a view illustrating a process of transmitting control information from the mobile device according to the embodiment of the present invention.

FIG. 3 is a view illustrating a process of transmitting the control information from the mobile device according to the embodiment of the present invention. Referring to FIG. 3, the mobile device 10 receives the input of the user through the user interface (S301), and determines the control information based on the received input (S302). The mobile device 10 generates the sound wave data based on the ID of the external device 20 to be controlled, and the determined control information (S303), and outputs the sound wave generated by the speaker (S304). The output sound wave may be the sound wave of the audible frequency area or the sound wave of the non-audible frequency area. The output sound wave may also be a form combined with predetermined music or a voice previously stored in the mobile device 10.

The external device 20 may receive and analyze the sound wave output through the sound wave receiving apparatus (S305) to acquire the ID and the control information of the external device 20, and may perform the corresponding operation based on the acquired control information (S306). The external device 20 does not perform the operation when the ID of the external device 20 is not its own ID.

The external device 20 may receive the sound wave output through the sound wave receiving apparatus, segments the sound wave into a plurality of frames depending on a predetermined time interval, identify frequencies corresponding to each of the plurality of frames by a frequency analysis for each of the plurality of frames, and generate the control information corresponding to the sound wave based on a plurality of symbols corresponding to the identified frequencies. In this case, for the frequency analysis, the external device 20 needs to perform the fast Fourier transform to transform a time signal into a frequency signal. A sample of an infinite length undergoes an ideal Fourier transform, and as a result data of a time base are transformed into data of a frequency base. However, in actual implementation, it is impossible to take and process the sample of the infinite length, and therefore the frequency analysis is performed in a frame unit. In this case, a spectral leakage occurs and thus an unintended frequency component may be detected along therewith. Further, if sufficient periodicity of the sound wave within the analysis frame is not secured or a length of the analysis frame and periodicity of the sound wave are not just matched with each other, a phenomenon of attenuating an observed spectral magnitude may occur. The attenuation phenomenon leads to the phenomenon that a real signal component (or main lobe) is smaller than a surrounding signal component (or side lobe) due to the spectral leakage, thereby reducing a recognition rate.

Figure 4A:
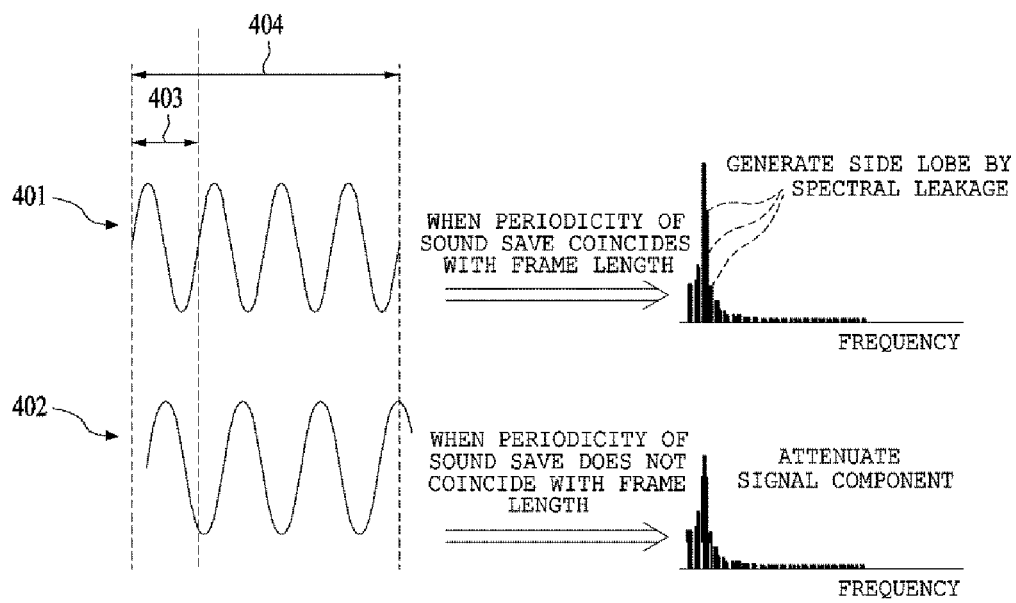
FIGS. 4A to 4D are views for describing an example of a process of generating a sound wave data.

Describing it with reference to FIG. 4A, in a signal with reference numeral 401, the periodicity of the sound wave coincides with a frame length (reference numeral 404 or reference numeral 404) and thus the real signal component (or main lobe) may be relatively accurately detected, while in a signal with reference numeral 402, the periodicity of the sound wave does not coincide with the frame length and thus a magnitude of the real signal component (or main lobe) may be relatively more attenuated than that of the surrounding signal component (or side lobe). The surrounding signal component (or side lobe) may interfere with the real signal component (or main lobe) to reduce the recognition rate for the real signal component (or main lobe).

Therefore, according to the embodiment of the present invention, the sound wave data generation unit 103 may allow each of the plurality of frequencies to have a margin frequency above and below, when the plurality of frequencies are mapped to the plurality of symbols. For example, if the sound wave data generation unit 103 determines the plurality of frequencies as shown in the above Table 6, and then determines any one of the plurality of symbols as the first frequency, frequencies above and below the first frequency among the plurality of frequencies may be selected as the margin frequency. Further, the sound wave data generation unit 103 may not use the margin frequency for mapping to the plurality of symbols. As a result, the plurality of frequencies may be arranged in an order of a frequency (mapping frequency) mapped to a symbol, a frequency (margin frequency) not mapped to a symbol, a frequency mapped to a symbol, and a frequency (or mapping frequency) mapped to a symbol. Differently describing based on the above Table 6, if a frequency of 16468.75 Hz when i is 10 is mapped to the first symbol, both of a frequency of 16421.88 Hz when i is 9 and a frequency of 16515.63 Hz when i is 11 are the margin frequency, while a frequency mapped to the second symbol may be a frequency of 16375 Hz when i is 8 or a frequency of 16562.5 Hz when i is 12. In this point, a frequency mapped to the third symbol may be a frequency of 16281.25 Hz when i is 6 or a frequency of 16656.25 Hz when i is 14.

Figure 4B:
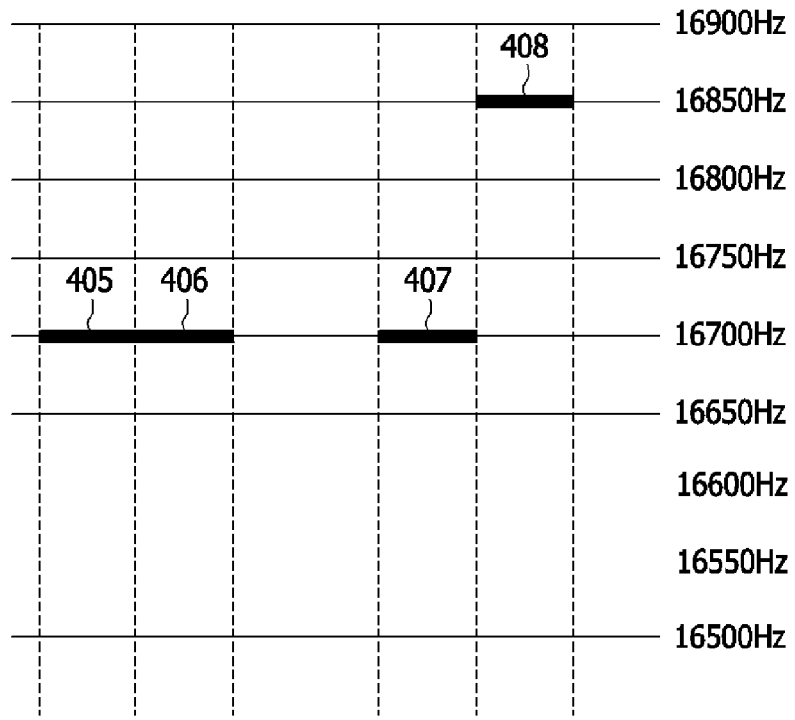

Describing the generation of the sound wave data with reference to FIG. 4B, the sound wave data generation unit 103 may determine the frequencies of each symbol included in control information 'AA . . . A3' consisting of N symbols, and generate signals (or sound signal, partial data) corresponding to each of the determined frequencies. In detail, the sound wave data generation unit 103 may generate a signal 405 corresponding to a frequency '16700 Hz' of a first symbol 'A' of the control information, a signal 406 corresponding to a frequency '16700 Hz' of a second symbol 'A' of the control information, a signal 407 corresponding to a frequency '16700 Hz' of an N−1-th symbol 'A' of the control information, and generate a signal 408 corresponding to a frequency '16850 Hz' of an N-th symbol '3' of the control information. As described above, the sound code (or sound wave data) may be generated by combining the signals (or sound signal, partial data) generated in this way depending on a time interval. In this case, the signal (or sound signal, partial data) and the sound code (or sound wave data) may be a frequency signal. However, the signal (or sound signal, partial data) and the sound code (or sound wave data) may also be a time signal (for example, sine wave signal having a specific frequency as a central frequency) transformed from the frequency signal. In this case, the signals (or sound signal, partial data) and the sound code (or sound wave data) may be transformed into a time signal transformed from the frequency signal by an inverse Fourier transform.

According to the embodiment of the present invention, the sound wave data generation unit 103 may determine the plurality of frequencies (for example, the first frequency and the second frequency) corresponding to the first symbol, and generate the first signal (or first sound signal, first partial data) corresponding to the plurality of frequencies. Similar thereto, the sound wave data generation unit 103 may determine the plurality of frequencies (for example, a third frequency and a fourth frequency) corresponding to the second symbol, and generate the second signal corresponding to the plurality of frequencies. As such, the sound wave data generation unit 103 may allocate or map at least two frequencies per one symbol, and generate an individual signal based on the at least two frequencies. Allocating the two frequencies per one information may represent more various types of information than allocating one frequency per one information in the related art. Further, in the present specification, generating one signal (or sound signal, partial data) or sound code (or sound wave data) corresponding to one frequency is represented as a pure tone encoding technique, and generating one signal or sound code corresponding to at least two frequencies may be represented as a multi tone encoding technique.

Figure 4C:
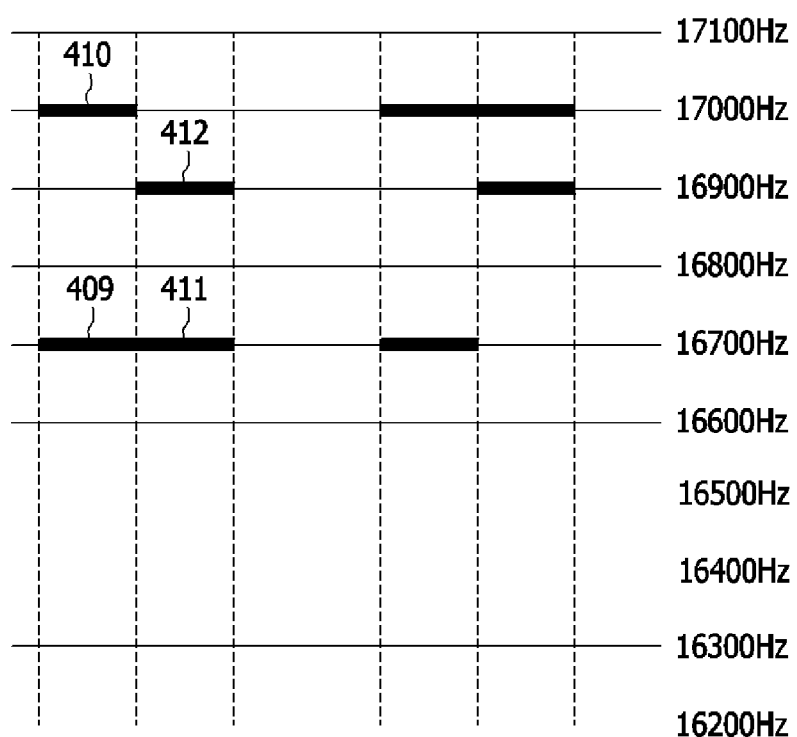

Describing the generation of the sound wave data with reference to FIG. 4C, the sound wave data generation unit 103 may determine the plurality of frequencies of each symbol included in control information 'Az . . . A3' consisting of N symbols, and generate signals corresponding to the determined frequencies. For example, the sound wave data generation unit 103 may allocate or map both of the first frequency of '16700 Hz' and the second frequency of '17000 Hz' to the first symbol 'A,' generate a first sub signal 409 having the first frequency as a fundamental frequency a second sub signal 410 having the second frequency as a fundamental frequency, and generate the first signal based on the generated first sub signal 409 and second sub signal 410. The sound wave data generation unit 103 may allocate or map both of the first frequency of '16700 Hz' and the third frequency of '17000 Hz' to a first symbol 'z,' generate a third sub signal 411 having the first frequency as a fundamental frequency, a fourth sub signal 412 having the second and third frequencies as a fundamental frequency, and generate the second signal based on the generated third sub signal 411 and second sub signal 412.

If the external device 20 receives the sound wave through the mike, an echo occurs due to acoustic characteristics of a surrounding space and thus it may be difficult to decode the sound wave. That is, the previously output sound wave is invaded into the subsequent output sound wave area, which may lead to a confusion about a frequency detection. For example, when the symbol 'A' is mapped to a frequency '10000 Hz,' the symbol B is mapped to a frequency '20000 Hz,' a symbol 'C' is mapped to a frequency '30000 Hz,' and a symbol 'D' is mapped to '40000 Hz' and when sound waves corresponding to control information 'ABCD' is output by the mobile device 10, the external device 20 may recognize 'ABBD' or 'AACD' which is the wrong decoding result due to the echo components.

Thereby, according to the embodiment of the present invention, the sound wave data generation unit 103 may use a continuity symbol (or redundancy symbol) for informing that the same symbol is continuously output. That is, the sound wave data generation unit 103 defines a rule "a previous code and a current code may not the same as each other' and when the real control information is redundant like 'AACD,' the continuity symbol (or redundancy symbol) may be selected instead of the second symbol 'A' redundant with the first symbol 'A.' For example, when the symbol 'A' is mapped to a frequency '10000 Hz,' the symbol 'B' is mapped to a frequency '20000 Hz,' the symbol 'C' is mapped to a frequency '30000 Hz,' and the symbol 'D' is mapped to a frequency '40000 Hz,' respectively, and the continuity symbol (or redundancy symbol) is determined as $, the sound wave data generation unit 103 may change 'AACD' to 'A$CD,' determine frequencies corresponding to the 'A$CD,' and generate the sound wave data corresponding to the 'A$CD.'

According to the embodiment of the present invention, the sound wave data generation unit 103 may perform pulse shaping on the sound wave data (or sound code) to generate the shaped sound wave data (or sound code). The pulse shaping is an example of a signal processing process, and the pulse shaping may minimize the spectral leakage of the sound wave data (or sound code), and remove or minimize an interference between the signals of the sound wave data (or sound code) or an inter-symbol interference of the sound wave data (or sound code). Further, the pulse shaping is appropriate to control a sound of an audible area. A window used for the pulse shaping is diverse, and includes a Hanning window or a Tukey window, for example.

According to the embodiment of the present invention, the sound wave data generation unit 103 may continuously generate at least two of the signals corresponding to the symbol, so as to generate a signal group corresponding to the symbol. In this case, the sound wave data generation unit 103 may continuously generate (for example, continuously generate five times) at least two signals corresponding to the symbol and having a first time, so as to generate a signal group corresponding to the symbol and having a second time. Further, the second time may be larger than the first time. For example, if the second time is 50 ms, the first time may be 10 ms smaller than the second time. Further, in this case, the signal group may include five signals. Further, according to the embodiment of the present invention, the signal may be represented as a sub signal, and the signal group may also be represented as a signal including a plurality of sub signals.

Figure 4D:
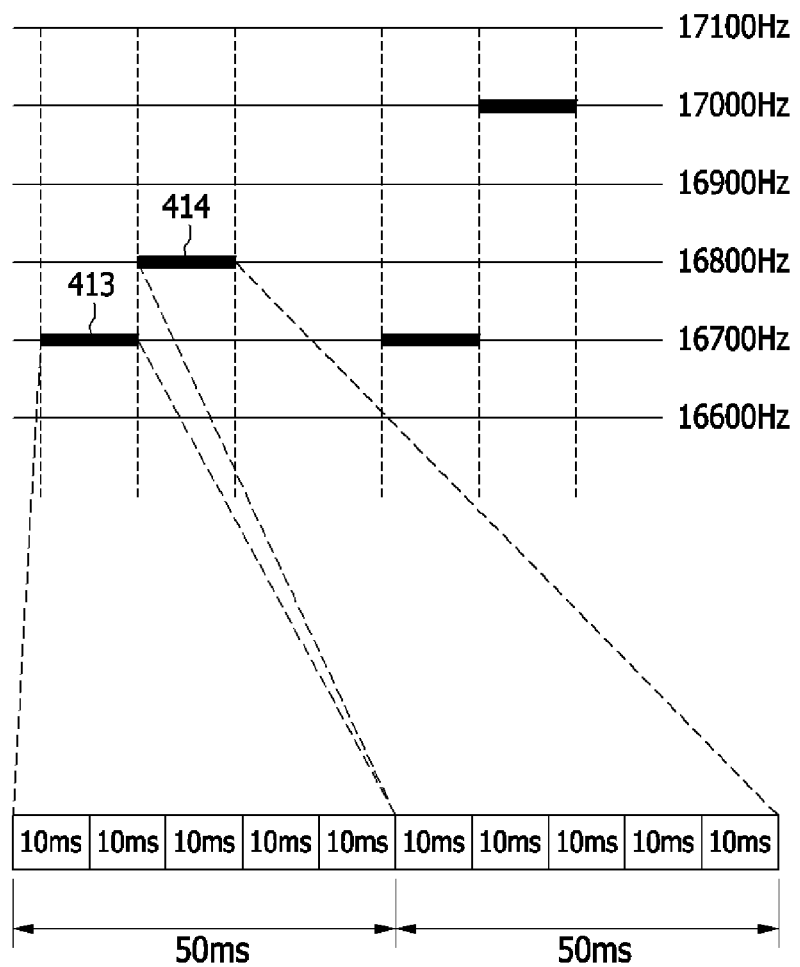

Referring to FIG. 4D, the sound wave data generation unit 103 may determine a frequency '16700 Hz' corresponding to the first symbol, and continuously generate five signals corresponding to a frequency '16700 Hz' and having a time of 10 ms, so as to generate a signal group 413 corresponding to the frequency '16700 Hz' and the time of 50 ms. Similarly, the sound wave data generation unit 103 may determine a frequency '16800 Hz' corresponding to the second symbol, and continuously generate five signals corresponding to a frequency '16800 Hz' and having a time of 10 ms, so as to generate a signal group 414 corresponding to the frequency '16800 Hz' and the time of 50 ms. Differently represented according to the embodiment of the present invention, the sound wave data generation unit 103 may determine the frequency '16800 Hz' corresponding to the second symbol, and continuously generate five signals corresponding to the frequency '16800 Hz' and having the time of 10 ms, so as to generate the signal group 414 corresponding to the frequency '16700 Hz' and the time of 50 ms. Further, the above-described first time may be a unit time dividing a frame.

Figure 5:
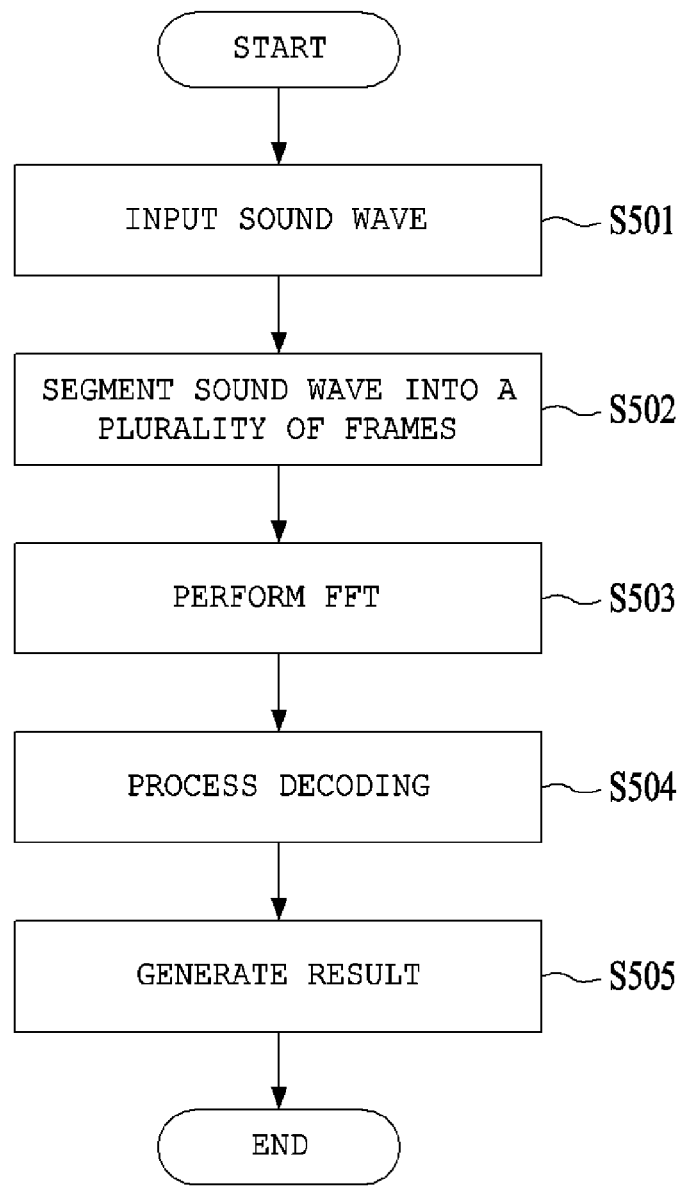
FIG. 5 is a flow chart for describing an example of operations performed by a process of decoding a sound wave.

FIG. 5 is a flow chart for describing an example of operations performed by a process of decoding the sound wave. Referring to FIG. 5, the external device 20 (or an internal module of the external device 20) may, when receiving the sound wave output from the mobile device 10 (S501), segment the sound wave into the plurality of frames (S502), perform the fast Fourier transform on the segmented frame (S503), and perform a decoding process based on the transformed result (S504) to generate results (S505). In this case, the result may be the control information.

Figure 6:
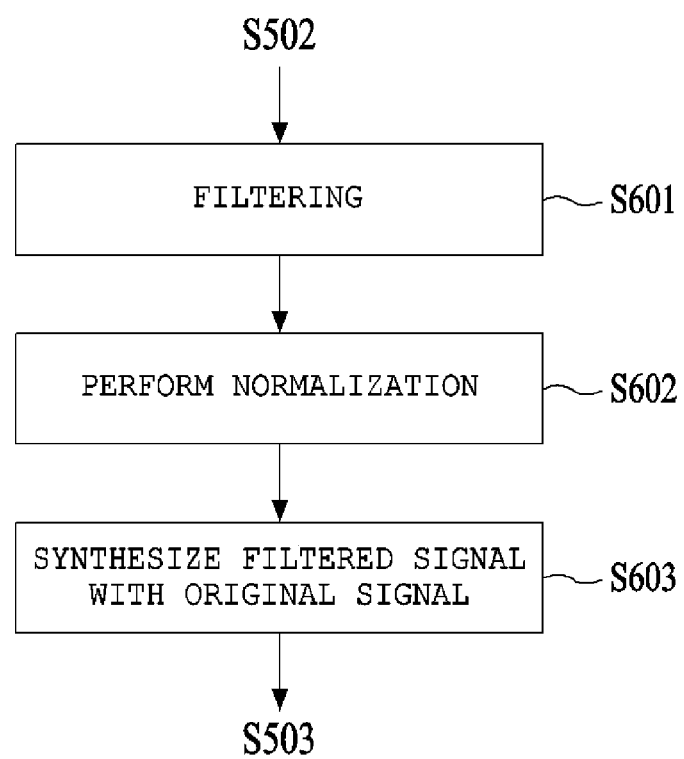
FIG. 6 is a flow chart for describing another example of the operations performed by the process of decoding a sound wave.

FIG. 6 is a flow chart for describing another example of the operations performed by the process of decoding the sound wave. Referring to FIG. 6, the external device 20 (or internal module of the external device 20) may further perform steps S601 to S603 between steps S502 and S503 of FIG. 5. In step S601, in order to extract a signal in the non-audible frequency band in which an input gain is relatively smaller among the input sound waves, the external device 20 may use a high pass filter which sets the audible frequency band as a stop band and the non-audible frequency band as a pass band. The sound wave passing through the high pass filter may have only a component in the non-audible frequency band. Further, in the step S601, the external device 20 may amplify a signal passing through the filter within an expressible quantization range.

In step S602, the external device 20 may perform normalization (or amplitude normalization). To this end, the external device 20 may change a weight value in real time using a ratio of a largest value of the frame of the input sound wave and a preset reference value. In this case, one example of the reference value is a half value of a maximum quantization amplitude. The reason of using the half value of the maximum quantization magnitude (amplitude) as the reference value needs to consider both of the non-audible area and the audible area. When the sound wave is quantized with 16 bits, the expressible range is between $-2^{15}$ to $(2^{15}-1)$, and the external device 20 may maximally amplify the magnitude of the signal within the expressible quantization range compared to FFT scaling in step S503.

In step S603, the external device 20 may add the filtered and output sound wave source and an original sound wave source. By this, the frequency component of the audible band and the frequency component of the non-audible band may be formed so as to have the magnitude with the same ratio as each other. The reason of adding the original sound wave source is that it is difficult to decode the audible band because the frequency component of the audible band is little present. By adding the original sound wave source at a specific ratio, it is possible to decode both of the audible area and the non-audible area.

Steps S601 to S603 are performed, such that the external device 20 may supplement a disadvantage of scaling of fixed point FFT algorithm which may occur upon performing only the steps of FIG. 5. The magnitude and the frequency configuration of the signal variably input hourly lead to a severe error during an FFT scaling process, and therefore it is difficult to coherently secure the recognition rate. Simply amplifying the magnitude of the input signal may not be a solution. The reason is that since the input signal of the audible area has a larger value than the input signal of the non-audible area, therefore the overflow that the frequency component of the non-audible area is beyond the quantization range before being sufficiently amplified occurs, and thereby losing the purpose of the amplification.

The external device 20 separately extracts the signal of the non-audible area and the signal of the audible area by using the filter to perform the possibly maximum amplification in each area, and adds two sound sources thereto, so as to secure a maximum valid bit for the FFT scaling, and thereby improving the recognition rate without greatly increasing a computation, compared to the case of performing only the steps of FIG. 5.

Figure 7A:
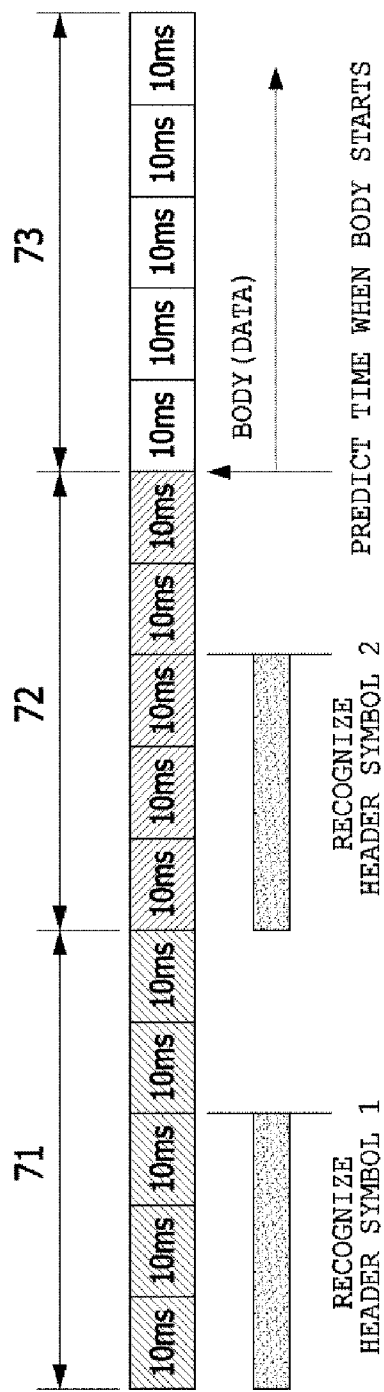
FIGS. 7A and 7B are views for describing an example of the process of decoding a sound wave.
Figure 7B:
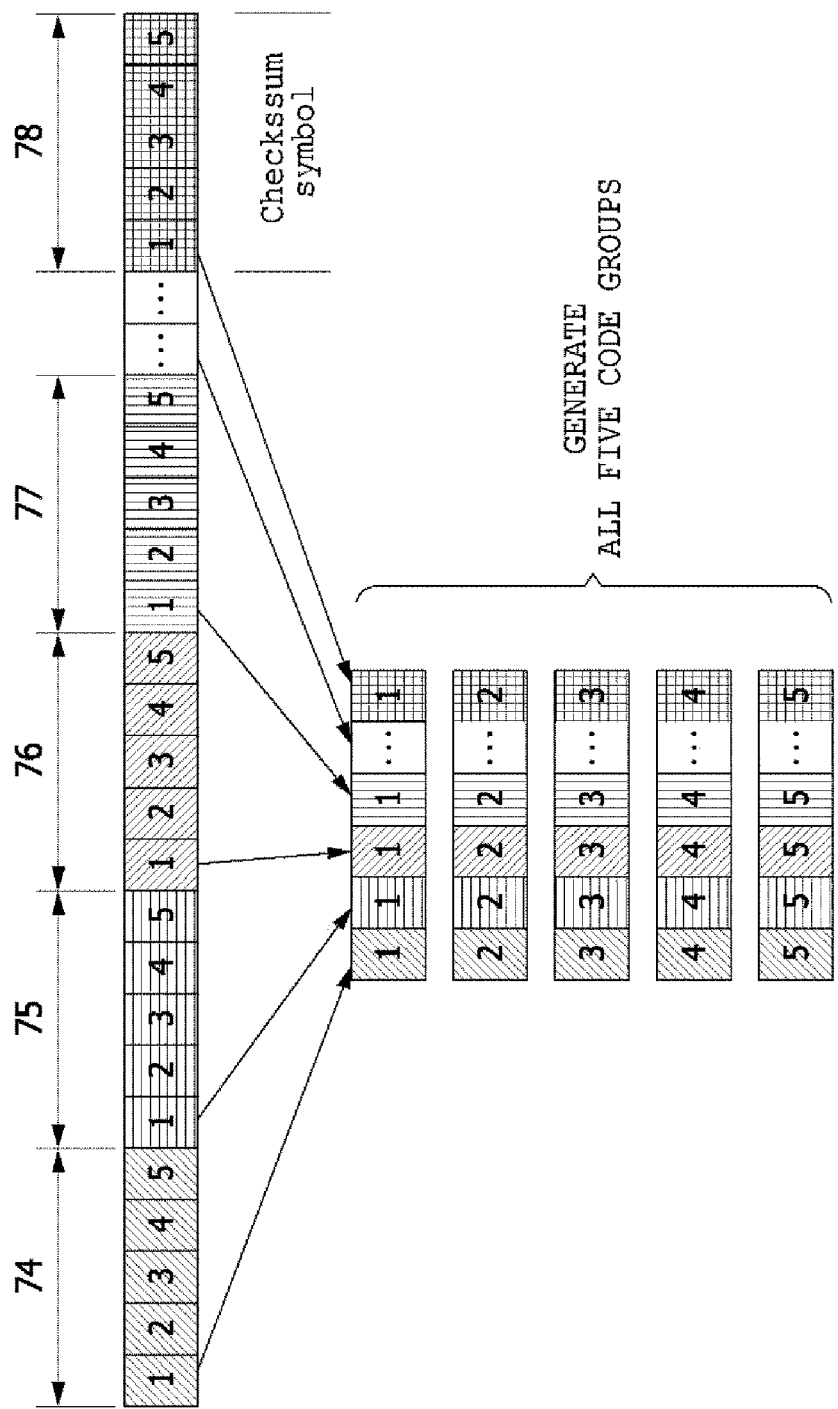

FIGS. 7A and 7B are views for describing an example of the process of decoding the sound wave. The external device 20 may detect a header symbol or a tail symbol using the plurality of frames corresponding to the sound wave, prior to performing the decoding process (or decoding algorithm).

Describing it with reference to FIG. 7A, when recognizing previous two or three symbols of a symbol group 71 corresponding to a first header, the external device 20 may determine that the first header symbol is recognized. Further, if the continuous two or three frames have the same frequency components of spectral peak values as each other, the external device 20 may determine that the first header symbol is recognized. In this case, in order to determine that the continuous two or three frames have the same frequency components of spectral peak values as each other, the external device 20 may know the frequency component of the first header symbol in advance. Further, when recognizing previous two or three symbols of a symbol group 72 corresponding to a second header, the external device 20 may determine that the second header symbol is recognized.

Further, if the continuous two or three frames have the same frequency components of spectral peak values as each other, the external device 20 may determine that the second header symbol is recognized.

Similarly, when recognizing previous two or three symbols of a symbol group 73 corresponding to the tail, the external device 20 may determine that the tail symbol is recognized. Further, if the continuous two or three frames have the same frequency components of spectral peak values as each other, the external device 20 may determine that the tail symbol is recognized.

The external device 20 may perform the decoding process (or decoding algorithm). First, when the header is detected, the external device 20 may estimate and store a time when the data actually starts. Describing it with reference to FIG. 7A, when the first header symbol group (or first header symbols) are detected, and the second header symbol group (or second header symbols) are detected, the external device 20 may predict a time when the data (or body) corresponding to the control information starts as approximately 20 ms after the second header symbol is recognized.

At the time when the data (or body) starts, the external device 20 may segment the sound wave as much as the number of preset frames until the tail (or tail group, tail symbol) is detected, and may group and store the segmented data in an order pair. Describing it with reference to FIG. 7B, the external device 20 may arrange each of the five symbols included in a symbol group 74 in a code group, arrange each of the five symbols included in a symbol group 75 in another code group, and then perform the same arrangement procedure on a symbol group 76, a symbol group 77, and the like, and finally arrange each of the five symbols included in a checksum symbol group 78 in another code group.

Next, the external device 20 may determine that the continuity symbol (or redundancy symbol) is present in each code group, and if the continuity symbol is present, recover it to an original symbol, confirm whether the checksum is correct in each code group, then select the code group that the checksum is correct, and select the code group having the largest accumulated spectral energy among the selected code groups as a final code group. The external device 20 may confirm or generate the control information using the symbols within the finally selected code group.

Figure 8:
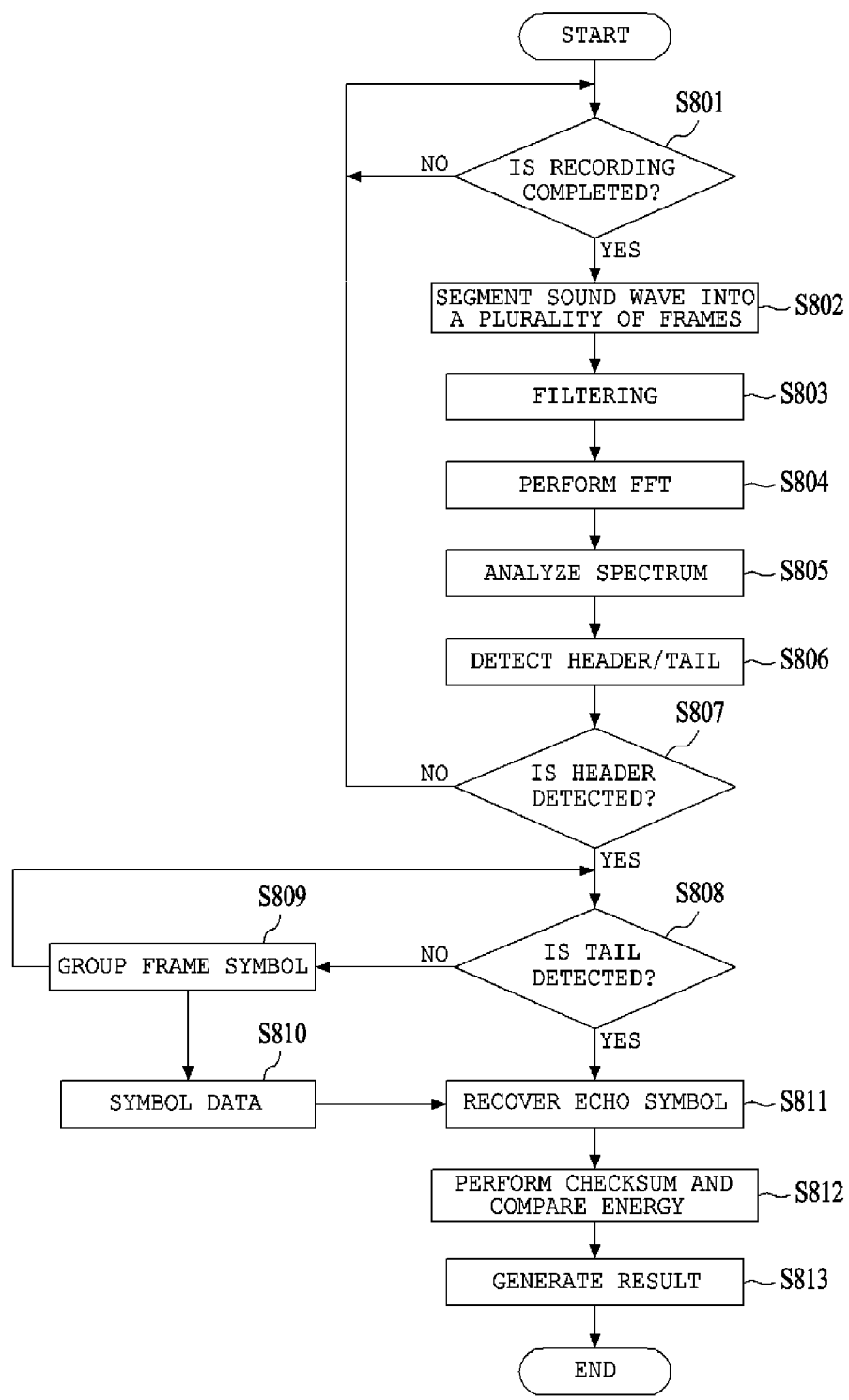
FIG. 8 is a flow chart for describing another example of the process of decoding a sound wave.

FIG. 8 is a flow chart for describing another example of the process of decoding the sound wave. Describing it with reference to FIG. 8, the external device 20 (or internal module of the external device 20) may determine whether the input sound wave is recorded (S801), and if it is determined that the recording is completed, segment the sound wave into a plurality of frames (S802), filtering the plurality of segmented frames (S803), perform the FFT based on the filtered result (S804), perform the spectral analysis on the FFT result (S805), and detect the header and the tail based on the spectral analysis result (S806). Referring to FIG. 8, the external device 20 may determine whether the header is detected (S807), if it is determined that the header is detected, determine whether the tail is detected (S808), and if it is determined that the tail is not detected, perform frame symbol grouping (S809) to generate a symbol data for the code group (S810), and then if it is determined that the tail is detected, perform the recovery on the echo symbol based on the symbol data (S811), perform the checksum on each of the plurality of code groups using the recovered result, select the code group having the correct checksum, select the code group having the largest spectral energy among the selected code groups as the final code group (S812), and generate a result (for example, control information) based on the selected final code group (S813).

Figure 9:
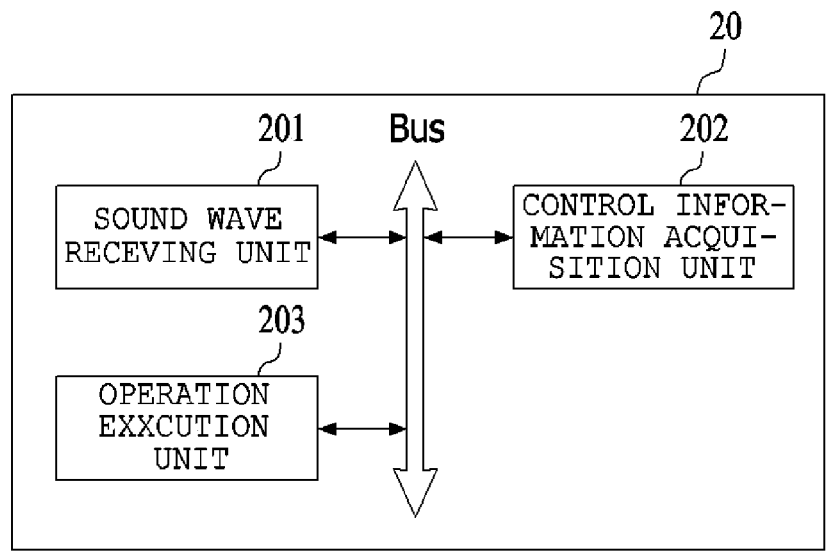
FIG. 9 is a view illustrating a configuration of an external device according to the embodiment of the present invention.

FIG. 9 is a view illustrating a configuration of the external device according to the embodiment of the present invention. Referring to FIG. 9, the external device 20 includes a sound wave receiving unit 201, a control information acquisition unit 202, and an operation execution unit 203. However, the configuration of the external device 20 illustrated in FIG. 9 is not limited to the above-described configurations.

The sound wave receiving unit 201 receives the sound wave output from the mobile device 10 through the sound wave receiving apparatus. For example, the sound wave receiving unit 201 may receive the sound wave output from the mobile device 10 through a mike apparatus. The sound wave received through the mike may be the sound wave of the non-audible area or the sound wave of the audible area, and may also be the sound wave synthesized with music or a voice.

The control information acquisition unit 202 acquires the ID and the control information of the external device 20 using the sound wave. The control information acquisition unit 202 may segment the sound wave input through the sound wave receiving apparatus into a specific frame and transforms the sound wave into a frequency domain, analyze all the audible or non-audible frequency band by the frequency analysis to interpret a code, information, and the like inserted into the sound wave, and acquire the control information included in the sound wave by a scheme of confirming and correcting an error based on the error correction algorithm performed upon the encoding of the sound wave data. In this case, the control information may be a control instruction.

The control information acquisition unit 202 may segment the sound wave into the plurality of frames depending on the predetermined time interval, identify the frequency corresponding to each of the plurality of frames by the frequency analysis for each of the plurality of frames, and generate the control information corresponding to the sound wave based on the plurality of partial information corresponding to the identified frequencies.

The control information acquisition unit 202 may segment the sound wave into the plurality of frames depending on the predetermined time interval. For example, the control information acquisition unit 202 segments the sound wave into the plurality of frames depending on a time interval of 10 ms. In this case, when the sound wave is a sound wave which is sustained for 50 ms second, the sound wave may be segmented into five frames.

The control information acquisition unit 202 may identify the frequencies corresponding to each of the plurality of frames by the frequency analysis for each of the plurality of frames. In this case, each of the plurality of frames includes a sound signal having a predetermined frequency and the frequencies corresponding to each of the plurality of frames may mean the frequency of the sound signal. Generally, the plurality of frequencies may be selected within the range between 16000 Hz and 24000 Hz. Further, an interval of the plurality of frequencies may be variously determined as 50 Hz, 100 Hz, and 200 Hz. Further, the control information acquisition unit 202 may analyze a peak of the frequencies for each of the plurality of frames to identify the frequency.

The control information acquisition unit 202 may identify, for example, 16000 Hz which is the frequency of the sound signal included in the first frame among the plurality of frames and 17000 Hz which is the frequency of the sound signal included in the second frame.

The control information acquisition unit 202 may identify the frequency by the frequency analysis. For this purpose, the control information acquisition unit 202 may identify the frequency by using a frequency transform technique and an inverse frequency transform technique for an analog sound code, the plurality of frames, or each of sound signals of the plurality of frames. One example of the frequency transform technique is the fast Fourier transform (FFT) and one example of the inverse frequency transform technique is an inverse fast Fourier transform (IFFT).

The control information acquisition unit 202 may generate the control information corresponding to the sound wave based on the plurality of partial information corresponding to each of the identified frequencies. For example, when the sound code consists of three frames, the frequency of the first frame is 15000 Hz, the frame of the second frame is 15200 Hz, and the frequency of the third frame is 17000 Hz, the control information acquisition unit 202 may generate partial information '0' corresponding to the 15000 Hz, partial information '1' corresponding to the 15200 Hz, and partial information 'A' corresponding to the 17000 Hz, respectively.

The control information acquisition unit 202 may generate the control information corresponding to the sound wave based on the plurality of partial information. For example, when the partial information of the first frame is '0,' the partial information of the second frame is '1,' and the partial information of the third frame is 'A,' the control information acquisition unit 202 may combine the partial information to decode or generate '01A' which is the control information corresponding to the sound code.

The control information acquisition unit 202 may recognize a voice by the voice recognition to generate the first information corresponding to the voice and generate the second information corresponding to the sound code, and generate information by using the first information and the second information. For example, the control information acquisition unit may decode the second information by using the first information, or generate information by combing the first information with the second information.

When separately operating the frequency band of the voice and the non-audible frequency band of the sound code from each other, it is possible to simultaneously perform the voice recognition and the sound code recognition by the same hardware (for example, decoding apparatus) while minimizing the interference therebetween. By this, the user will receive a human machine interface (HMI) with more diversity by the combination of the voice and the sound code.

The operation execution unit 203 performs the operation corresponding to the control information based on the acquired control information. For example, the operation execution unit may operate a function of controlling a wind direction of an air conditioner based on the control information for controlling the wind direction of the air conditioner.

According to another embodiment of the present invention, when receiving an input requesting the current state or the fault diagnosis information of the external device 20 through the sound wave receiving unit 201, the external device 20 may further include a sound wave data generation unit and an output unit which are generate the current state or the fault diagnosis information as the sound wave data and output it, respectively.

Meanwhile, the external device 20 may further include a communication unit which transmits state information including at least one of the current state or the fault diagnosis information of the device to the mobile device 10.

The configuration and operation of the sound wave data generation unit, the output unit, and the communication unit may be inferred from the operation of the mobile device 10 described in FIG. 2, and therefore will not be described in detail.

Further, matters of the external device 20 which are not described with reference to FIG. 5 apply the contents described with reference to the foregoing drawings.

Figure 10:
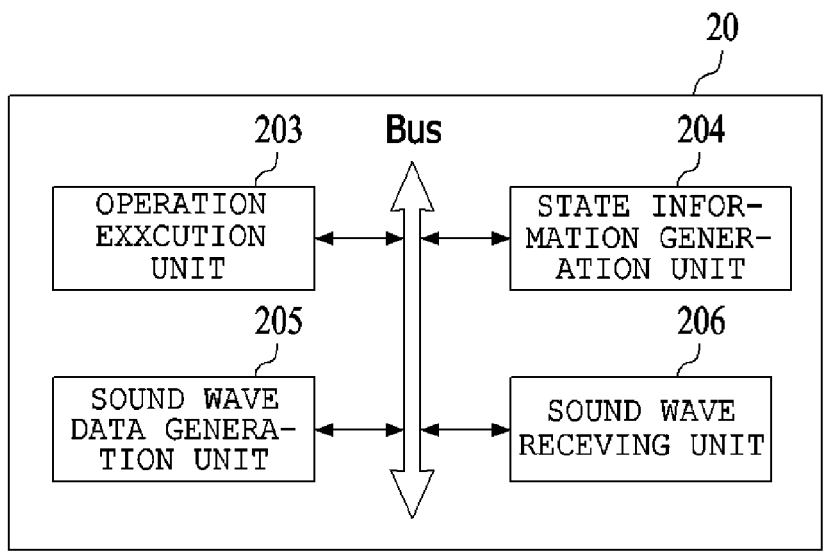
FIG. 10 is a view illustrating a configuration of the external device according to the embodiment of the present invention.

FIG. 10 is a view illustrating a configuration of the external device according to the embodiment of the present invention. According to the embodiment of the present invention, the external device 20 may include an operation execution unit 203, a state information generation unit 204, a sound wave data generation unit 205, and a sound wave output unit 206.

The operation execution unit 203 performs the operation of the external device 20. In this case, the operation execution unit 203 performs the operation by at least one power apparatus included in the external device 20. For example, when the external device 20 is a refrigerator, the operation execution unit 203 may perform a circulation operation of a refrigerant by the power apparatus included in the refrigerator. As another example, when the external device 20 is a cleaner, the operation execution unit 203 may perform an operation of moving the cleaner by the power apparatus included therein. As another example, when the external device 20 is an electric fan, the operation execution unit 203 may perform an operation of rotating a fan of the electric fan by the power apparatus thereof.

The state information generation unit 204 generates the state information of the external device 20 associated with the operation. In this case, the state information is at least one of the current state and the fault diagnosis information of the external device 20. One example of the current state includes the on/off of the external device 20, the power supply use state, the operation time, and the like, and one example of the fault diagnosis information includes abnormal symptom occurrence information, the error code, the fault portion information, and the like.

When the abnormal symptom associated with the operation of the external device 20 occurs, the state information generation unit 204 may generate state information corresponding to the abnormal symptom. For example, when the external device 20 is the refrigerator and the operation of the external device 20 stops, the state information generation unit 204 may generate the state information indicating that the operation of the external device 20 stops. As another example, the external device 20 is a washing machine and a predetermined error code occurs in the washing machine, the state information generation unit 204 may generate state information corresponding to the error code.

The sound wave data generation unit 205 generates the sound wave data corresponding to the state information. In detail, the sound wave data generation unit 205 may generate the plurality of partial information corresponding to the state information, determine the plurality of frequencies corresponding to the plurality of generated partial information, and combine sound signals corresponding to each of the plurality of determined frequencies according to a predetermined time interval to generate the sound wave data corresponding to the state information.

Contents which are not described with reference to the operation of the sound wave data generation unit 205 are the same as or similar to the contents describing the operation of the sound wave data generation unit 103 of FIG. 2, and therefore the operation of the sound wave data generation unit 103 of FIG. 2 applies the above-described contents as it is. However, upon the application, the 'control information' in the contents described with reference to the operation of the sound wave data generation unit 103 of FIG. 2 is considered as the 'state information.'

The sound wave output unit 206 outputs the sound wave corresponding to the sound wave data generated by the sound wave generation apparatus. In this case, one example of the sound wave generation apparatus is a speaker apparatus, but it is not limited thereto. The output sound wave is input to the mobile device 10.

Although not illustrated in FIG. 10, the external device 20 of FIG. 10 may further include the sound wave receiving unit 201 and the control information acquisition unit 202. The sound wave receiving unit 201 receives the sound wave output from the mobile device 10 through the sound wave receiving apparatus, and the control information acquisition unit 202 acquires the control information using the received sound wave. In this case, the control information may be a response to the sound wave output from the sound wave output unit 206, and the operation execution unit 203 may perform the operation based on the control information.

Figure 11:
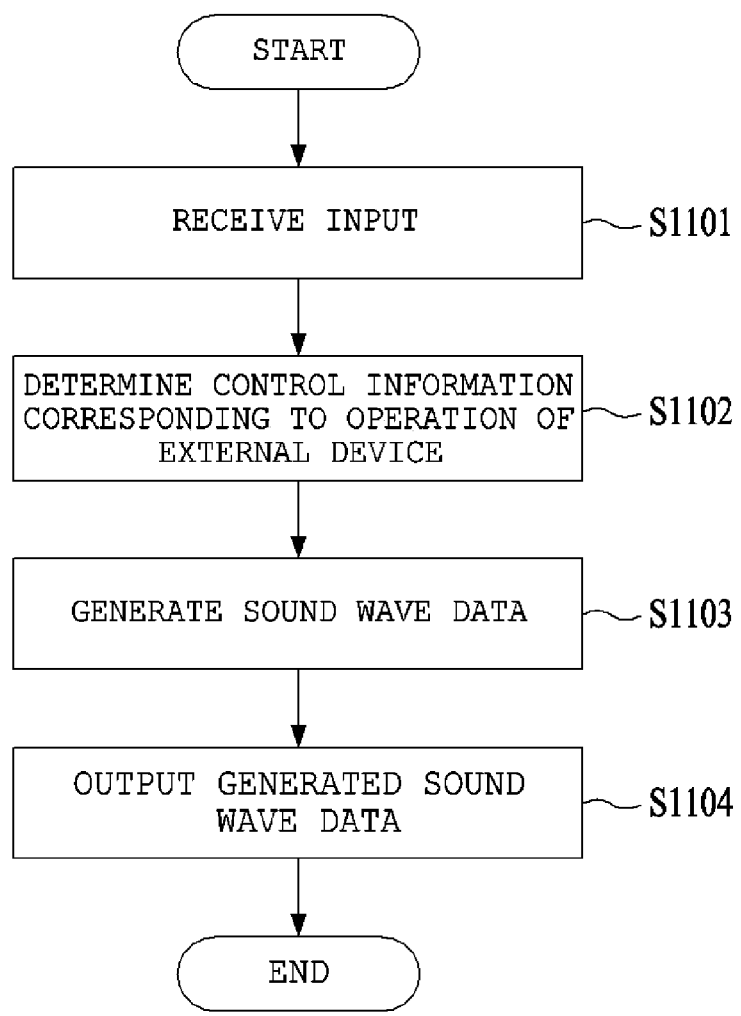
FIG. 11 is a flow chart illustrating operations performed by a method for outputting a sound wave according to an embodiment of the present invention.

FIG. 11 is a flow chart illustrating operations performed by a method for outputting a sound wave according to an embodiment of the present invention. The method for outputting a sound wave using the mobile device 10 illustrated in FIG. 11 includes the steps processed time-serially in the mobile device 10 described with reference to FIGS. 1 and 2. Therefore, even in the contents which will not be described below, the contents described for the mobile device 10 with reference to FIGS. 1 and 2 are also applied to FIG. 11.

Referring to FIG. 11, the mobile device 10 may receive at least one input through the user interface S1101, and determine the control information corresponding to the operation of the external device 20 based on the received at least one input S1102. The mobile device 10 generates the sound wave data corresponding to the control information S1103. The sound wave data generated by the mobile device 10 may be the audible sound wave data form in which the control information is mapped to the frequency, the non-audible sound wave data form using the non-audible frequency, and the sound wave data in a form coupled with a predetermined music or voice stored in the mobile device 10. The mobile device 10 may output the sound wave corresponding to the generated sound wave data through the sound wave generation apparatus S1104.

The external device 20 may receive the sound wave output from the mobile device 10, and perform the operation corresponding to the control information based on the control information included in the sound wave.

Although not illustrated, according to the embodiment of the present invention, the method for outputting a sound wave may include executing the operation of the device (not illustrated), generating the state information of the device associated with the operation (not illustrated), generating the sound wave data corresponding to the state information, and outputting the sound wave corresponding to the sound wave data generated by the sound wave generation apparatus (not illustrated). In this case, the method for outputting a sound wave is performed by the external device 20 of FIG. 10. Therefore, the contents which will not be described below apply the contents described with reference to the external device 20 of FIG. 10. Further, the method for outputting a sound wave may further include receiving the sound wave output from the mobile device 10 by the sound receiving apparatus (not illustrated), acquiring the control information using the received sound wave, and executing the operation based on the control information.

The method for outputting a sound wave described with reference to FIG. 11 and the method for outputting a sound wave not illustrated may also be respectively implemented in a form of a recording medium including instructions executable by a computer such as program modules executed by the computer. A computer-readable medium may be any available medium which may be accessed by a computer and includes all of volatile and non-volatile media and separable and non-separable media. Further, the computer readable medium may include both of a computer storage medium and a communication medium. The computer storage medium includes all of the volatile and non-volatile media and the separable and non-separable media which are implemented by a computer-readable instruction, a data structure, a program module or any method or technique for storing information such as other data. The communication medium typically includes the computer readable instruction, the data structure, the program module, other data of a modulated data signal such as a carrier wave, or other transmission mechanism and include any information transmission medium.

The foregoing description of the present invention is only an example and those skilled in the art will appreciate that the present invention may be easily modified to other detailed forms, without changing technical ideas or essential features of the present invention. Therefore, it will be understood by those skilled in the art that embodiments described hereinabove are illustrative rather than being restrictive in all aspects. For example, each component described as a single type may be dispersed and practiced, and components which are described as being similarly dispersed may be practiced in a combined form.

Also, it will be understood by those skilled in the art that that the scope of the present invention will be defined by the claims rather than the above-described description and all modifications and alternations derived from the claims and their equivalents are included in the scope of the present invention.

The invention claimed is:

1. A mobile device, comprising:
   an input receiving unit to receive at least one input through a user interface;
   a control information determination unit to determine control information corresponding to an operation of an external device based on the at least one input, wherein the control information includes a first symbol and a second symbol, and the first symbol and the second symbol are selected from an ASCII code set, a HEX code set, or a binary code set;
   a sound wave data generation unit to generate a sound wave data corresponding to the control information;
   an output unit to output a sound wave corresponding to the sound wave data generated by a sound wave generation apparatus; and
   an input unit to receive the sound wave generated from the external device through a sound wave receiving apparatus,
   wherein the control information determination unit determines second control information based on the received sound wave;
   wherein the sound wave data generation unit determines a first frequency corresponding to the first symbol and a second frequency corresponding to the second symbol, and generates the sound wave data based on the first frequency and the second frequency, and the sound wave data includes a portion corresponding to the first frequency and a portion corresponding to the second frequency;
   wherein, when the first symbol and the second symbol are for the same frequency, and the first symbol and the second symbol are continuously positioned in the control information, the second symbol is a symbol different from the first symbol to indicate that the same frequency is continuously output.

2. The mobile device of claim 1, wherein the sound wave data generation unit generates a first sound signal corresponding to the first frequency and a second sound signal corresponding to the second frequency, and combines the first sound signal with the second sound signal depending on a predetermined time interval to generate the sound wave data.

3. The mobile device of claim 1, wherein the first symbol is a letter.

4. The mobile device of claim 3, wherein the second symbol is any one of natural numbers larger than 1.

5. The mobile device of claim 1, wherein the sound wave is input to the sound wave receiving apparatus of the external device, and the external device performs the operation thereof.

6. The mobile device of claim 1, wherein the sound wave data generation unit generates the sound wave data corresponding to the control information and an ID of the external device, and
   the external device is a device selected as a destination of the sound wave among a plurality of external devices.

7. The mobile device of claim 1, wherein the first frequency is selected from a plurality of frequencies, and
   the plurality of frequencies are arranged to so as have a constant frequency interval from a lowest frequency to a highest frequency among the plurality of frequencies.

8. The mobile device of claim 1, wherein the output unit outputs a first sound wave corresponding to the sound wave data generated by the sound wave generation apparatus and a second sound wave corresponding to a pre-stored music data.

9. The mobile device of claim 1, wherein the sound wave generated from the external device includes a response to the output sound wave, and
   the sound wave generated from the external device corresponds to any one of the ID of the external device, an ID of the mobile device, a current state of the external device, and fault information on the external device.

10. The mobile device of claim 9, wherein the sound wave generated from the external device corresponds to a current state of the external device and fault information on the external device.

11. A method for outputting a sound wave, comprising:
    receiving at least one input through a user interface in the mobile device of claim 1;
    determining the control information;
    generating the sound wave data corresponding to the control information; and
    outputting the sound wave corresponding to the sound wave data generated by the sound wave generation apparatus.

12. A system for controlling an external device, comprising:
    the mobile device of claim 1; and
    the external device, comprising:
    a sound wave receiving unit to receive the sound wave output from the mobile device through a sound wave receiving apparatus;

a control information acquisition unit to acquire control information including an ID of the mobile device using the sound wave; and an operation execution unit to execute an operation corresponding to the control information based on the acquired control information, wherein the control information acquisition unit determines a first frequency corresponding to a first portion of the sound wave and a second frequency corresponding to a second portion of the sound wave, generates a first symbol corresponding to the first frequency and a second symbol corresponding to the second frequency, and acquires the control information based on a combination of the first symbol with the second symbol; and the first symbol and the second symbol are selected from an ASCII code set, a HEX code set, or a binary code set;

wherein, when the first symbol and the second symbol are for the same frequency, and the first symbol and the second symbol are continuously positioned in the control information, the second symbol is a symbol different from the first symbol to indicate that the same frequency is continuously output.

13. A system for controlling an external device, comprising:

the mobile device of claim 1; and an external device, comprising:

an operation execution unit to execute an operation of the external device;

a state information generation unit to generate state information on the external device associated with the operation, wherein the state information is a current operation state information of the external device or a fault diagnosis information of the external device, and the state information includes a first symbol and a second symbol;

a sound wave data generation unit to generate a sound wave data corresponding to the state information; and a sound wave output unit to output a sound wave corresponding to the sound wave data generated by a sound wave generation apparatus, wherein the sound wave data generation unit determines a first frequency corresponding to the first symbol and a second frequency corresponding to the second symbol, and generates the sound wave data based on the first frequency and the second frequency;

the first symbol and the second symbol are selected from an ASCII code set, a HEX code set, or a binary code set; and the sound wave data includes a portion corresponding to the first frequency and a portion corresponding to the second frequency;

wherein, when the first symbol and the second symbol are for the same frequency, and the first symbol and the second symbol are continuously positioned in the control information, the second symbol is a symbol different from the first symbol to indicate that the same frequency is continuously output.

14. The mobile device of claim 1, wherein the first and second frequencies are in an audible sound wave frequency band.

15. The mobile device of claim 1, wherein the first and second frequencies are in an inaudible sound wave frequency band.

16. The mobile device of claim 1, wherein the sound wave data generation unit generates the determined control information as the sound wave data by a multi tone based encoder.

17. The mobile device of claim 1, wherein the sound wave data generation unit generates the determined control information as the sound wave data by a pure tone based encoding.

18. The mobile device of claim 1, wherein the sound wave data generation unit generates continuously more than one same signal corresponding to the first frequency and continuously more than one same signal corresponding to the second frequency to generate a first signal group corresponding to the first symbol and a second signal group corresponding to the second symbol.

19. The mobile device of claim 1, wherein the sound wave data generation unit maps the determined control information to each frequency, synthesize the mapped control information with a pure tone of an inaudible band to generate a predetermined code, and apply a protocol having an error correction code to the predetermined code to generate a non-audible sound wave data.

20. The mobile device of claim 1, wherein the sound wave data generation unit maps the determined control information to each frequency, and apply the mapped control information to a protocol having an error correction code to generate a sound wave data.

* * * * *